application No. KR 10-2019-0078028.

United States Patent
Zhuang et al.

(10) Patent No.: US 11,177,256 B2
(45) Date of Patent: Nov. 16, 2021

(54) ODD-FIN HEIGHT CELL REGIONS, SEMICONDUCTOR DEVICE HAVING THE SAME, AND METHOD OF GENERATING A LAYOUT DIAGRAM CORRESPONDING TO THE SAME

(71) Applicant: TAIWAN SEMICONDUCTOR MANUFACTURING COMPANY, LTD., Hsinchu (TW)

(72) Inventors: Hui-Zhong Zhuang, Kaohsiung (TW); Ting-Wei Chiang, New Taipei (TW); Chung-Te Lin, Tainan (TW); Lee-Chung Lu, Taipei (TW); Li-Chun Tien, Tainan (TW); Ting Yu Chen, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 16/432,024

(22) Filed: Jun. 5, 2019

(65) Prior Publication Data

US 2020/0006335 A1 Jan. 2, 2020

Related U.S. Application Data

(60) Provisional application No. 62/691,602, filed on Jun. 28, 2018.

(51) Int. Cl.
*H01L 27/088* (2006.01)
*H01L 29/423* (2006.01)
(Continued)

(52) U.S. Cl.
CPC .......... *H01L 27/0886* (2013.01); *G06F 30/39* (2020.01); *H01L 27/0207* (2013.01); *H01L 29/42356* (2013.01); *G06F 2119/18* (2020.01)

(58) Field of Classification Search
CPC .......... H01L 27/0886; H01L 29/42356; H01L 27/0207; H01L 21/823431; H01L 25/0657;
(Continued)

(56) References Cited

U.S. PATENT DOCUMENTS 7,260,442 B2   8/2007   Hwang et al.
8,786,019 B2   7/2014   Wu et al.
(Continued)

FOREIGN PATENT DOCUMENTS

JP    2001358223    12/2001
KR    20010088859    9/2001
(Continued)

OTHER PUBLICATIONS

Office Action dated May 26, 2020 from corresponding application No. KR 10-2019-0078028.
(Continued)

*Primary Examiner* — Edward Chin
(74) *Attorney, Agent, or Firm* — Hauptman Ham, LLP

(57) ABSTRACT

A semiconductor device includes fins extending substantially parallel to a first direction, at least one of the fins being a dummy fin; and at least one of the fins being an active fin; and at least one gate structure formed over corresponding ones of the fins and extending substantially parallel to a second direction, the second direction being substantially perpendicular to the first direction; wherein the fins and the at least one gate structure are located in a cell region which includes an odd number of fins. In an embodiment, the cell region is substantially rectangular and has first and second edges which are substantially parallel to the first direction; and neither of the first and second edges overlaps any of the fins.

20 Claims, 12 Drawing Sheets

(51) Int. Cl.
　　　*H01L 27/02*　　　(2006.01)
　　　*G06F 30/39*　　　(2020.01)
　　　*G06F 119/18*　　(2020.01)

(58) Field of Classification Search
　　　CPC ... H01L 25/073; H01L 23/053; H01L 23/043;
　　　　　　H01L 23/3738; H01L 23/481; H01L
　　　　　　23/473; H01L 24/73; H01L 2225/06513;
　　　　　　H01L 2225/06572; H01L 2224/16146;
　　　　　　H01L 2224/1703; H01L 2224/73204;
　　　　　　H01L 24/83; H01L 2224/16235; H01L
　　　　　　2224/17181; H01L 2224/33181; H01L
　　　　　　2224/73203; H01L 2924/15153; H01L
　　　　　　2224/81895; H01L 2224/83102; H01L
　　　　　　24/33; H01L 2224/16227; H01L
　　　　　　2224/2929; H01L 24/29; H01L
　　　　　　2224/32145; H01L 2224/32225; H01L
　　　　　　24/13; H01L 24/16; H01L 2224/13025;
　　　　　　H01L 2224/29387; H01L 24/32; H01L
　　　　　　2224/73253; H01L 2224/29191; H01L
　　　　　　2224/29188; H01L 2224/29186; H01L
　　　　　　2224/29187; H01L 2224/2919; H01L
　　　　　　24/17; H01L 2225/06541; H01L
　　　　　　2225/06589; H01L 2225/06517; H01L
　　　　　　2224/29147; H01L 2924/01029; G06F
　　　　　　30/39; G06F 2119/18; Y02P 90/02
　　　See application file for complete search history.

(56) References Cited

U.S. PATENT DOCUMENTS

| | | | |
|---|---|---|---|
| 9,256,709 | B2 | 2/2016 | Yu et al. |
| 2013/0277760 | A1* | 10/2013 | Lu ..................... H01L 27/0886 |
| | | | 257/401 |
| 2013/0292777 | A1 | 11/2013 | Liaw |
| 2014/0040838 | A1 | 2/2014 | Liu et al. |
| 2015/0278429 | A1 | 10/2015 | Chang |
| 2016/0098508 | A1 | 4/2016 | Baek et al. |
| 2017/0011160 | A1 | 1/2017 | Baek et al. |
| 2017/0229456 | A1 | 8/2017 | Sharma et al. |
| 2017/0255735 | A1 | 9/2017 | Kim et al. |
| 2017/0271367 | A1* | 9/2017 | Baek ................. H01L 27/11807 |

FOREIGN PATENT DOCUMENTS

| | | | |
|---|---|---|---|
| KR | 20160039526 | | 4/2016 |
| KR | 20160039526 A | * | 4/2016 |
| TW | 201719768 | | 6/2017 |
| TW | 201724507 | | 7/2017 |
| TW | 201727895 | | 8/2017 |
| WO | WO 0111688 | | 2/2001 |

OTHER PUBLICATIONS

Office Action dated Apr. 23, 2020 from corresponding application No. TW 108122417.
Notice of Allowance dated Oct. 13, 2020 for corresponding case No. DE 10-2019-115533 A1. (pp. 1-10).

* cited by examiner

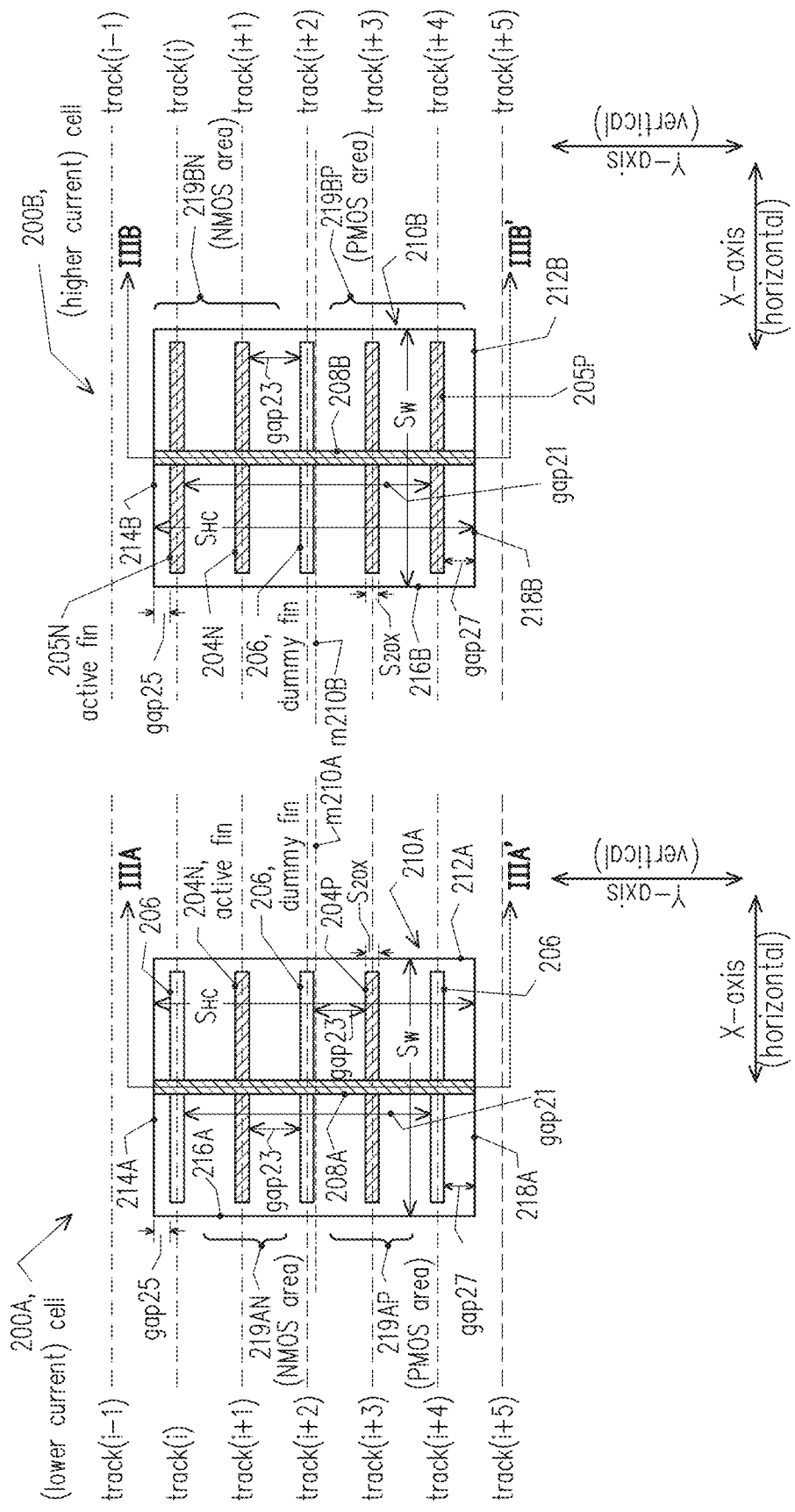

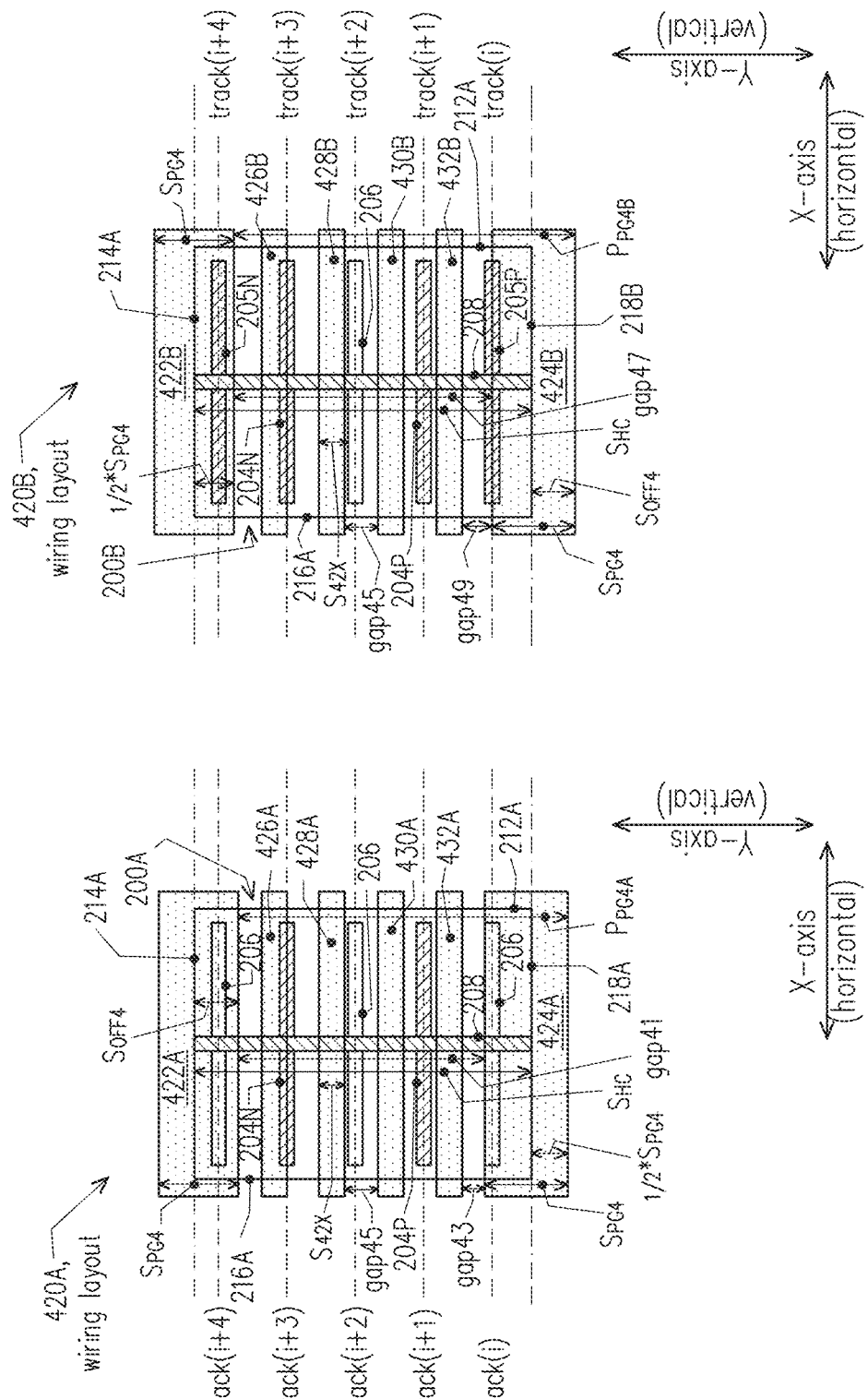

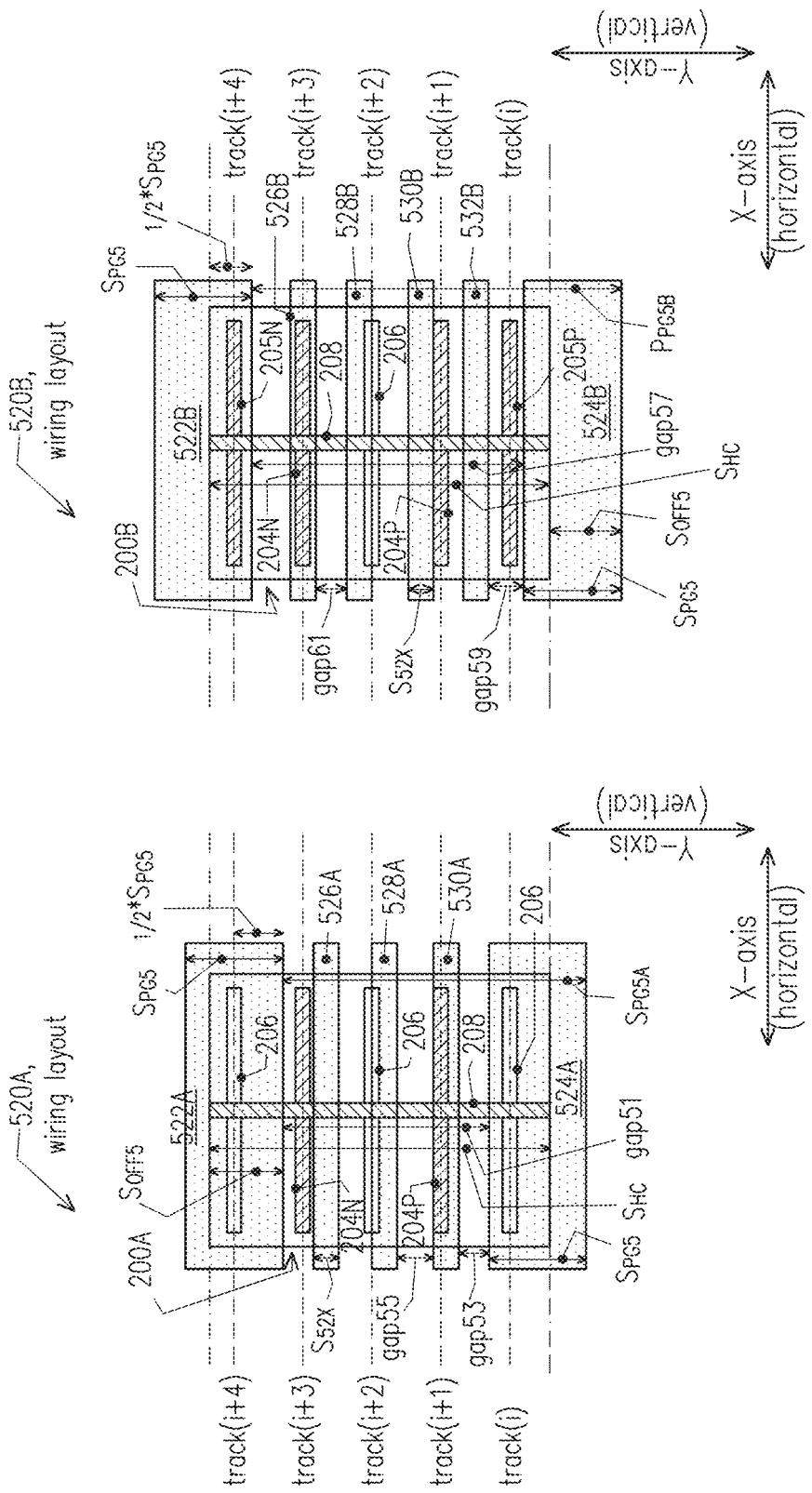

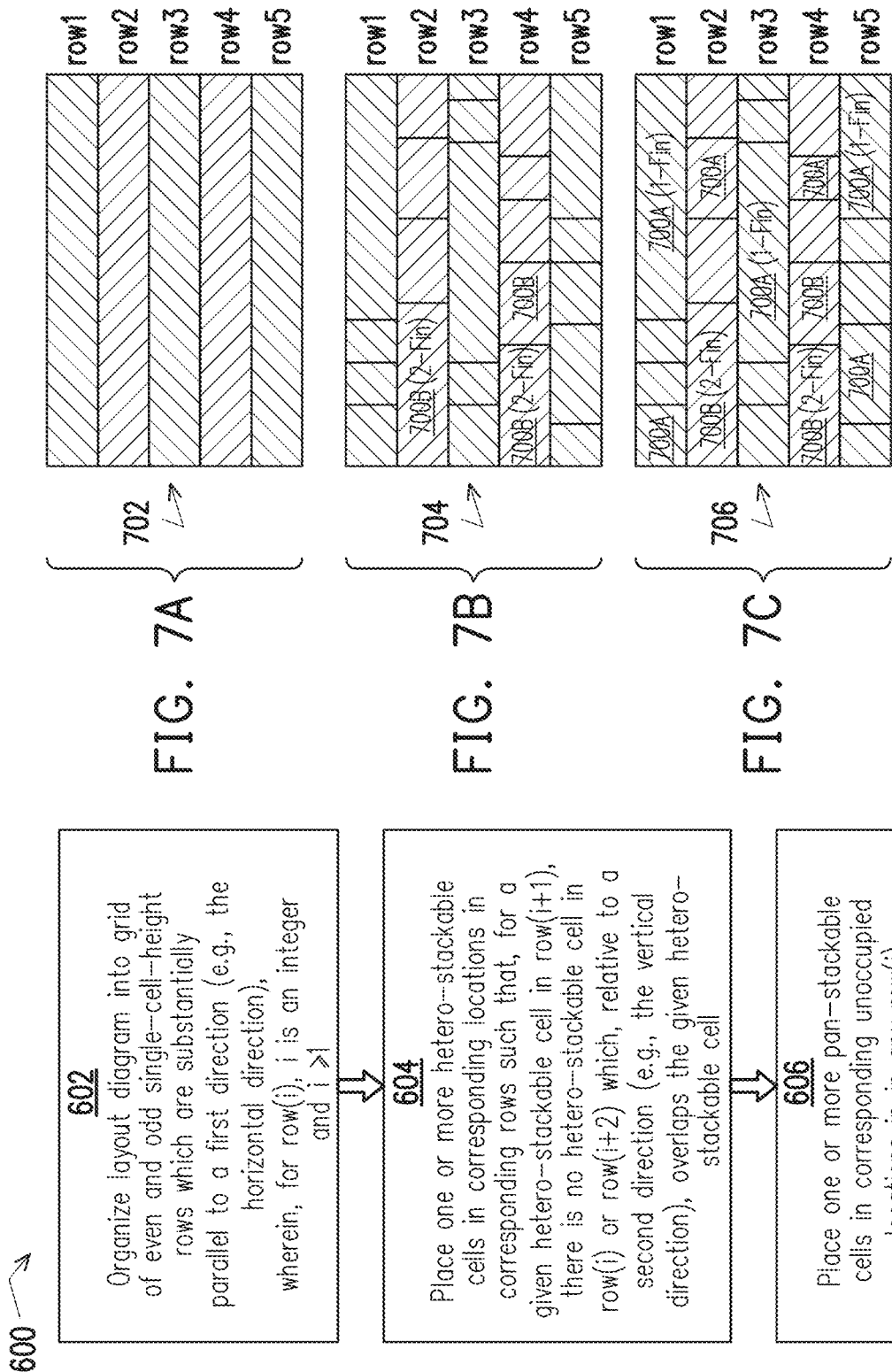

ODD-FIN HEIGHT CELL REGIONS, SEMICONDUCTOR DEVICE HAVING THE SAME, AND METHOD OF GENERATING A LAYOUT DIAGRAM CORRESPONDING TO THE SAME

PRIORITY CLAIM

The present application claims the priority of U.S. Provisional Application No. 62/691,602, filed Jun. 28, 2018, which is incorporated herein by reference in its entirety.

BACKGROUND

A semiconductor device, one or more of which are included in an integrated circuit (IC), includes a number of electronic devices. One way in which to represent a semiconductor device is with a plan view diagram referred to as a layout diagram (hereinafter, layout). A layout is hierarchical and is decomposed into modules which carry out higher-level functions as indicated by the semiconductor device's design specifications.

For a given semi-custom design (SCD) project, a custom cell is designed with an arrangement that is specific to the given SCD project in order to provide (in operation) a higher-level logic function that is specific to the SCD project. By contrast, a library of standard cells is designed with no particular project in mind and includes standard cells which provide (in operation) common, lower-level logic functions. In terms of a footprint within a layout (from the perspective of a plan view), custom cells are larger (typically, much larger) than standard cells. Moreover, for a given library, all of the standard cells have at least one dimension which is the same size (typically, the size being a multiple of a library-specific fixed dimension) in order to facilitate placement of the standard cells into a layout. Typically, the direction of the fixed dimension is parallel to the vertical direction or Y-axis. As such, standard cells are described as being predefined with respect to a given SCD project. Custom cells may or may not have at least one dimension that is the same size as the corresponding dimension of the standard cells.

BRIEF DESCRIPTION OF THE DRAWINGS

One or more embodiments are illustrated by way of example, and not by limitation, in the figures of the accompanying drawings, wherein elements having the same reference numeral designations represent like elements throughout. The drawings are not to scale, unless otherwise disclosed.

FIG. 2A is a layout diagram of an odd-fin height, standard cell, in accordance with some embodiments.

FIG. 2B is a layout diagram of an odd-fin height, standard cell, in accordance with some embodiments.

FIG. 4A is a layout diagram, in accordance with some embodiments.

FIG. 4B is a layout diagram, in accordance with some embodiments.

FIG. 5A is a layout diagram, in accordance with some embodiments.

FIG. 5B is a layout diagram, in accordance with some embodiments.

FIG. 6 is a flowchart of a method of generating a layout, in accordance with some embodiments.

FIGS. 7A-7C are corresponding layout diagrams in accordance with some embodiments.

DETAILED DESCRIPTION

Figure 1:
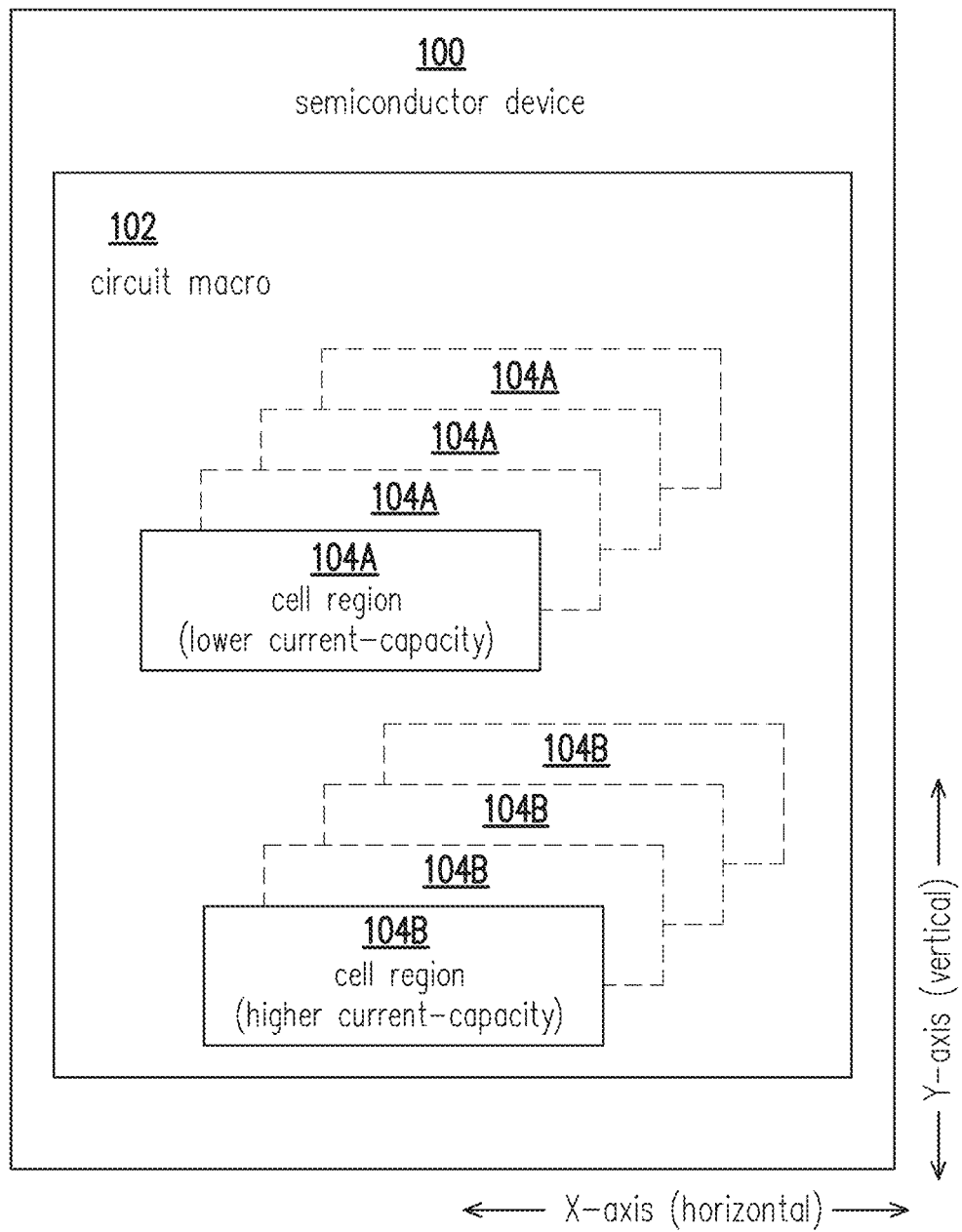
FIG. 1 is a block diagram of a semiconductor device in accordance with at least one embodiment of the present disclosure.

The following disclosure provides many different embodiments, or examples, for implementing different features of the provided subject matter. Specific examples of components, materials, values, steps, operations, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. As used herein in phrases such as "substantially parallel," "substantially the same," "substantially twice as," "substantially collinear," or the like, the adverb "substantially" should be understood as broadening the phrase of which "substantially" is a part so that the phrase denotes a scope which is inclusive of variations which result from manufacturing process-tolerances, e.g., the phrase "substantially parallel" includes not only parallel per se but also variances from parallel which result from manufacturing process-tolerances. Similarly, the phrase "substantially different" should be understood as describing differences which are greater in magnitude, at the least, than mere variations which result from manufacturing process-tolerances.

In some embodiments, the term "standard cell" refers to a standardized building block included in a library of various standard cells. In some embodiments, various standard cells are selected from a library thereof and are used as components in a layout diagram representing a circuit.

As used herein, an active fin pattern in a layout diagram will yield, by dint of fabrication of a corresponding semiconductor device, an active fin, wherein an active fin is a fin included in an active/operable finFET transistor. By contrast, a dummy fin pattern is a fin pattern which is not an active fin pattern. As used herein, a dummy fin pattern in a layout diagram will yield, by dint of fabrication of a corresponding semiconductor device, a dummy fin, wherein a dummy fin is a fin that is not used in an active/operable finFET transistor. In some embodiments, a dummy fin pattern is not designated for PMOS-configuration nor NMOS-configuration. In some embodiments, a dummy fin pattern is designated for PMOS-configuration or NMOS-configuration while also being designated for removal during fabrication of a semiconductor device, e.g., by being covered/overlaid with a cut-pattern, such that the dummy fin pattern will not yield an active fin.

In some embodiments in a two-dimensional context for which a first direction is the horizontal direction and a second direction is the vertical direction, and in which fin patterns of a finFET are substantially parallel to a first (e.g., horizontal) direction, the terms 'pan-stackable' and 'hetero-stackable' arise in the context of stacking, wherein stacking is relative to the first direction, and stacking of a first cell on a second cell refers to locating/positioning the first cell on the second cell in a layout diagram without there being a third cell interposed between the first and second cells in the second direction. More particularly, the term 'pan-stackable,' when used in the two-dimensional context and in reference to a first cell, indicates (A) that the first cell can be located/positioned stacked on a second cell (wherein the second cell is different than the first cell), and (B) that first and second instances of the first cell can be stacked on each other in the vertical direction. Also more particularly, the term 'hetero-stackable,' when used in the two-dimensional context and in reference to a cell, indicates that first and second instances of such a cell cannot be stacked directly on each other in the vertical direction.

In some embodiments, a standard cell for use in a layout diagram of a semiconductor device includes: fin patterns extending substantially parallel to a first (e.g., horizontal) direction, at least one of the fin patterns being a dummy fin, and at least one of the fin patterns being an active fin; and at least one gate pattern formed over corresponding ones of the fins and extending substantially parallel to a second (e.g., vertical) direction, the second direction being substantially perpendicular to the first direction; wherein the fin patterns and the at least one gate pattern are located in a cell which includes an odd number of fins. In some embodiments, the cell includes 5 fin patterns and has a size in the second (e.g., vertical) direction of 5 fin patterns. In some embodiments in which the cell includes 5 fin patterns and has a size in the second (e.g., vertical) direction of 5 fin patterns, 2 of the 5 fin patterns are active fin patterns and the cell is pan-stackable. In some embodiments in which the cell includes 5 fin patterns and has a size in the second (e.g., vertical) direction of 5 fin patterns, 4 of the 5 fin patterns are active fins and the cell is hetero-stackable.

FIG. 1 is a block diagram of a semiconductor device 100 in accordance with at least one embodiment of the present disclosure.

In FIG. 1, semiconductor device 100 includes, among other things, a circuit macro (hereinafter, macro) 102. In some embodiments, macro 102 is an SRAM macro. In some embodiments, macro 102 is a macro other than an SRAM macro. Macro 102 includes, among other things, one or more lower current-capacity cell regions 104A and one or more higher current-capacity cell regions 104B. The current capacity of cell region 104A is lower than the current-capacity of cell region 104B, hence cell region 104A is referred to as a lower current-capacity cell region. The current capacity of cell region 104B is higher than the current-capacity of cell region 104A, hence cell region 104B is referred to as a higher current-capacity cell region. In some embodiments, each cell region 104A is implemented based on a cell 200A (see FIG. 2A, discussed below). In some embodiments, each cell region 104B is implemented based on a cell 200B (see FIG. 2B, discussed below).

FIG. 2A is a layout diagram of an odd-fin height, standard cell 200A, in accordance with some embodiments.

As discussed in more detail below, cell 200A is referred to as pan-stackable. Again, the term 'pan-stackable,' when used in a two-dimensional context and in reference to a first cell, indicates (A) that the first cell can be located/positioned stacked on a second cell (wherein the second cell is different than the first cell), and (B) that first and second instances of the first cell can be stacked on each other in the vertical direction.

In FIG. 2A, cell 200A is arranged relative to a grid of substantially parallel tracks, of which some of the tracks are shown in FIG. 2A, namely track(i−1), track(i), . . . , track(i+5), where i is an integer and i≥1. The tracks are substantially parallel to a first direction, which is the horizontal (or X-axis) direction in FIG. 2A. A second direction is substantially perpendicular to the first direction such that, in FIG. 2A, the second direction is the vertical (or Y-axis) direction. In some embodiments, the first and second directions correspond to directions other than horizontal and vertical. A pitch of the tracks (hereinafter, 'track pitch') is determined according to layout design rules and the process/technology node by which a semiconductor device corresponding to the layout diagram which includes cell 200A will be fabricated.

In FIG. 2A, cell 200A is designated for CMOS configuration such that a semiconductor device fabricated based on a layout diagram which includes cell 200A would be a CMOS device. An example of a CMOS semiconductor device resulting from a layout diagram which includes cell 200A is semiconductor device 100 of FIG. 1, wherein cell region 104A of semiconductor device 100 results from cell 200A. Due to being designated for CMOS configuration, cell 200A is organized into an area 219AP designated for PMOS-configuration (hereinafter, 'PMOS-designated area' 219AP) and an area 219AN designated for NMOS-configuration (hereinafter, 'NMOS-designated area' 219AN). Details regarding CMOS configuration and corresponding fabrication are found, e.g., in U.S. Pat. No. 8,786,019, granted Jul. 22, 2014, the entirety of each of which is hereby incorporated by reference. In some embodiments, cell 200A is designated for PMOS configuration and not for CMOS configuration. In some embodiments, cell 200A is designated for NMOS configuration and not for CMOS configuration.

Cell 200A includes an odd number of fin patterns 204P, 204N and 206 and a gate pattern 208A. A size, S20X, in the second direction (which is the vertical direction in FIG. 2A) of each fin patterns 204P, 204N and 206 is determined according to layout design rules and the process/technology node by which a semiconductor device corresponding to the layout diagram which includes cell 200A will be fabricated.

For a semiconductor device fabricated (see FIG. 3A) based on a layout diagram which includes cell 200A, the semiconductor device will include fins corresponding to fin patterns 204P, 204N and 206 and a gate electrode corresponding to gate pattern 208A. Relative to a long axis of each fin pattern, fin patterns 204P, 204N and 206 are substantially aligned with (hereinafter, 'on') the corresponding tracks and so extend substantially parallel to the first direction (which is the horizontal direction in FIG. 2A). In particular, cell 200A of FIG. 2A includes 5 fin patterns. In some embodiments, cell 200A includes an odd number of fin patterns other than 5. In particular, cell 200A includes: a dummy fin pattern 206 on track(i); an active fin pattern 204N on track(i+1); a dummy fin pattern 206 on track(i+2); an active fin pattern 204P on track(i+3); and a dummy fin pattern 206 on track(i+4). A long axis of gate pattern 208A extends substantially parallel to the second direction (which is the vertical direction in FIG. 2A). Gate pattern 208A overlays dummy fin pattern 206 on track(i), active fin pattern 204N on track(i+1), dummy fin pattern 206 on track(i+2), active fin pattern 204P on track(i+3) and dummy fin pattern 206 on track(i+4).

As cell 200A is designated for CMOS configuration, PMOS-designated area 219AP includes active fin pattern 204P on track(i+3) which is designated for PMOS configuration. Similarly, NMOS-designated area 219AN includes active fin pattern 204N on track(i+1) which is designated for NMOS configuration. Dummy fin pattern 206 on track(i+2) provides a break between PMOS-designated area 219AP and NMOS-designated area 219AN. Because each of PMOS-designated area 219AP and NMOS-designated area 219AN includes one active fin pattern, cell 200A is referred to as a 1-fin type of cell.

In FIG. 2A, cell 200A has a substantially rectangular boundary 210A which includes edges 212A, 214A, 216A and 218A. A size of cell 200A, $S_{HC}$, in the second direction (which is the vertical direction in FIG. 2A), is 5 tracks/fin patterns, hence cell 200A is referred to as a 5 fin height/size cell. In some embodiments, the size $S_{HC}$ of cell 200A, in the second direction is an odd number of tracks/fin patterns other than 5 tracks/fin patterns. Relative to the second direction (which is the vertical direction in FIG. 2A), neither of top edge 214A nor bottom edge 218A overlaps any of active fin patterns 204P or 204N or dummy fin patterns 206. Relative to the first direction (which is the horizontal direction in FIG. 2A), neither of right edge 212A nor left edge 216A overlaps any of active fin patterns 204P or 204N or dummy fin patterns 206. In some embodiments, relative to the first direction, one or more of active fin patterns 204P or 204N or dummy fin patterns 206 extends to one or more of right edge 212A or left edge 216A and thereby overlaps edge 212A or 216A. Relative to the second direction, gate pattern 208A extends to each of top edge 214A and bottom edge 218A and thereby overlap edges 214A and 218A. In some embodiments, relative to the second direction, gate pattern 208A does not overlap one or more of edges 214A or 218A.

In some embodiments, a size, $S_W$, in the first direction between left edge 216A and right edge 212A is a predetermined, positive integer multiple of a pitch between polysilicon lines (hereinafter, 'poly pitch'), Pp, for the process/technology node by which a semiconductor device corresponding to the layout diagram which includes cell 200A will be fabricated. Accordingly, the size in the first direction between left edge 216A and right edge 212A of cell 200A is $S_W$=m*Pp, where m is an integer and m≥1. An example of a polysilicon line in a semiconductor device resulting a layout diagram which includes gate pattern 208A in cell 200A is a gate electrode (see FIG. 3A).

In some embodiments, to facilitate stacking pan-stackable cell 200A onto a hetero-stackable cell (e.g., hetero-stackable cell 200B of FIG. 2B, discussed below), or vice-versa, cell 200A shows asymmetry and various proportions. More particularly, in some embodiments, a distance, gap25, in the second direction (which, in FIG. 2A is the vertical direction) between dummy fin pattern 206 on track(i) and top edge 214A is different than a distance, gap27, in the second direction between dummy fin pattern 206 on track(i+4) and bottom edge 218A, such that gap25<gap27, thereby representing asymmetry. In some embodiments, cell 200A does not show asymmetry in gap25 and gap 27, rather gap25 is at least substantially equal to gap27. Immediately adjacent ones of fin patterns 204N, 204P and 206 are separated in the second direction by a distance, gap23. Dummy fin pattern 206 on track(i) is separated in the second direction from dummy fin pattern 206 on track(i+4) by a distance, gap21. Relative to each other, fin patterns 204N, 204P and 206 are distributed evenly in the second direction such that gap21=3*$S_{20X}$+4*gap23. In some embodiments, cell 200A has a different asymmetry and/or different proportions than are shown in FIG. 4A. While fin patterns 204N, 204P and 206 are distributed evenly in the second direction with respect to each other, dummy fin pattern 206 on track(i+2) is not substantially collinear with a midline m210A of cell 200A. As such fin patterns 204N, 204P and 206 are not distributed evenly in the second direction with respect to cell 200A, thereby representing asymmetry.

FIG. 2B is a layout diagram of an odd-fin height, standard cell 200B, in accordance with some embodiments.

As discussed in more detail below, cell 200B is referred to as hetero-stackable. Again, the term 'hetero-stackable,' when used in a two-dimensional context and in reference to a cell, indicates that first and second instances of such a cell cannot be stacked directly on each other in the vertical direction.

Cell 200B of FIG. 2B is similar to cell 200A of FIG. 2A. For brevity, the discussion of cell 200B will focus on differences of cell 200B with respect to cell 200A. An example of a CMOS semiconductor device resulting from a layout diagram which includes cell 200B is semiconductor device 100 of FIG. 1, wherein cell region 104B of semiconductor device 100 results from cell 200B. While cell 200B is designated for CMOS configuration, in some embodiments, cell 200B is designated for PMOS configuration and not for CMOS configuration. In some embodiments, cell 200B is designated for NMOS configuration and not for CMOS configuration.

Whereas cell 200A is referred to as pan-stackable, cell 200B is referred to as hetero-stackable, as discussed in more detail below.

Instead of including dummy fin patterns on track(i) and track(i+4) as in cell 200A, cell 200B includes: an active fin pattern 205P on track(i+4) which is designated for PMOS configuration; and an active fin pattern 205N on track(i) which is designated for NMOS configuration. Accordingly, PMOS-designated area 219BP in cell 200B, which includes fin patterns 204P and 205P, is larger than PMOS-designated area 219AP of cell 200A. Similarly, NMOS-designated area 219BN in cell 200B, which includes fin patterns 204N and 205N, is larger than NMOS-designated area 219AN of cell 200A. Gate pattern 208B overlays active fin pattern 205P, active fin pattern 204P, dummy fin pattern 206 on track(i+2), active fin pattern 204N and active fin pattern 205P. Because each of PMOS-designated area 219BP and NMOS-designated area 219BN includes two active fin patterns, cell 200B is referred to as a 2-fin type of cell.

In FIG. 2B, cell 200B has a substantially rectangular boundary 210B which includes edges 212B, 214B, 216B and 218B. A size of cell 200B, $S_{HC}$, in the second direction (which is the vertical direction in FIG. 2B), is 5 tracks/fin patterns, hence cell 200B is referred to as a 5 fin height/size cell. As such, cell 200B is the same size $S_{HC}$ in the second direction as cell 200A. In some embodiments, the size $S_{HC}$ of cell 200B, in the second direction is an odd number of tracks/fin patterns other than 5 tracks/fin patterns. Relative to the second direction (which is the vertical direction in FIG. 2B), neither of top edge 214B nor bottom edge 218B overlaps any of active fin patterns 204P, 205P, 204N or 205N or dummy fin pattern 206. Relative to the first direction (which is the horizontal direction in FIG. 2B), neither of right edge 212B nor left edge 216B overlaps any of active fin patterns 204P, 205P, 204N or 205N or dummy fin pattern 206. In some embodiments, relative to the first direction, one or more of active fin patterns 204P, 205P, 204N or 205N or dummy fin pattern 206 extends to one or more of right edge 212B or left edge 216B and thereby overlaps edge 212B or 216B. In some embodiments, the size, $S_W$, in the first direction between left edge 216B and right edge 212B of cell 200B is $S_W = m*Pp$, which is the same size as for cell 200A.

As noted, cell 200B includes active fin pattern 205P and active fin pattern 205N rather than dummy fin patterns 206 (as in cell 200A) on corresponding track(i+4) and track(i). In a layout diagram, stacking a first instance of cell 200B on a second instance of cell 200B would result in active fin pattern 205P (in the first instance of cell 200B) being located immediately next to active fin pattern 205N (in the second instance of cell 200B). If located immediately next to one another, then active fin pattern 205P (in the first instance of cell 200B) would be separated in the second direction active fin pattern 205N (in the second instance of cell 200B) by a distance which is less than a minimum separation threshold for active fin patterns, which would represent a design rule violation. Accordingly, to avoid violating the design rule, a first instance of cell 200B is not permitted to be stacked on a second instance of cell 200B. By contrast, cell 200B is permitted to be stacked on cell 200A, and cell 200A is permitted to be stacked on cell 200B. Accordingly, cell 200B is referred to as hetero-stackable.

In some embodiments, to facilitate stacking hetero-stackable cell 200B onto pan-stackable cell 200A, or vice-versa, cell 200B shows asymmetry and various proportions. More particularly, in some embodiments, gap25 represents the distance (in the second direction) between active fin pattern 205N and top edge 214B, and gap27 represents the distance (in the second direction) between active fin 205P and bottom edge 218B. Gap25 is different than gap27 gap25<gap27, thereby representing asymmetry. In some embodiments, cell 200B does not show asymmetry in gap25 and gap 27, rather gap25 is at least substantially equal to gap27. Immediately adjacent ones of fin patterns 204N, 204P, 205N, 205P and 206 are separated in the second direction by a distance, gap23. Active fin pattern 205N is separated in the second direction from active fin pattern 205P by gap21. Relative to each other, fin patterns 204N, 204P, 205N, 205P and 206 are distributed evenly in the second direction such that gap21=3*$S_{20X}$+4*gap23. In some embodiments, cell 200B has a different asymmetry and/or different proportions than are shown in FIG. 4A. While fin patterns 204N, 204P, 205N, 205P and 206 are distributed evenly in the second direction with respect to each other, dummy fin pattern 206 on track(i+2) is not substantially collinear with a midline m210B of cell 200B. As such fin patterns 204N, 204P, 205N, 205P and 206 are not distributed evenly in the second direction with respect to cell 200B, thereby representing asymmetry.

Returning to FIG. 2A, as noted, cell 200A includes dummy fin patterns 206 rather than active fin pattern 205P and active fin pattern 205N (as in cell 200B) on corresponding track(i+4) and track(i). In a layout diagram, stacking a first instance of cell 200A on a second instance of cell 200A would result in dummy fin pattern 206 on track(i+4) in the first instance of cell 200A being located immediately next to dummy fin pattern 206 on track(i) in the second instance of cell 200A, thereby resulting in active fin patterns being separated in the second direction (which is the vertical direction in FIG. 2A) by a distance is equal to or exceeds the minimum separation threshold for active fin patterns, and thereby representing compliance with the design rule. Also, in a layout diagram, stacking cell 200A on cell 200B would result in dummy fin pattern 206 on track(i+4) in the cell 200A being located immediately next to active fin pattern 205N in cell 200B, thereby resulting in active fin patterns being separated in the second direction by a distance equal to or exceeding the minimum separation threshold for active fin patterns, and thereby representing compliance with the design rule. Furthermore, in a layout diagram, stacking cell 200B on cell 200A would result in active fin pattern 205P of cell 200B being located immediately next to dummy fin pattern 206 on track(i) in the cell 200A, thereby resulting in active fin patterns being separated in the second direction by a distance equal to or exceeding the minimum separation threshold for active fin patterns, and thereby representing compliance with the design rule. Accordingly, cell 200A is referred to as pan-stackable.

Returning to FIG. 2B, as noted, an example of a cell region in a semiconductor device resulting from a layout diagram which includes cell 200B is cell region 104B of semiconductor device 100 of FIG. 1. Also, as noted, the current capacity of cell region 104B is higher than the current-capacity of cell region 104A, hence cell region 104B is referred to as a higher current-capacity cell region. The higher current-capacity of cell region 104B is due to cell region 104B including 4 active fins (see discussion of FIG. 3B), which results from cell 200B including 4 active fin patterns, namely active fin patterns 204P, 204N, 205P and 205N.

Returning to FIG. 2A, as noted, an example of a cell region in a semiconductor device resulting from a layout diagram which includes cell 200A is cell region 104A of semiconductor device 100 of FIG. 1. Also, as noted, the current capacity of cell region 104A is lower than the current-capacity of cell region 104B, hence cell region 104A is referred to as a lower current-capacity cell region. The lower current-capacity of cell region 104A is due to cell region 104A including 2 active fins (see discussion of FIG. 3A), which results from cell 200A including 2 active fin patterns, namely active fin patterns 204P and 204N.

Returning to FIG. 2B, as noted, cell 200B provides a 2-fin type cell having a 5 fin height/size. According to another approach, a 2-fin type cell is provided in a cell having 6 fin patterns and a 6 fin height/size cell (hereinafter, the '6&6 cell'). Relative to the second direction (which is the vertical direction in FIG. 2B), each of the top edge and the bottom edge of the 6&6 cell overlaps a dummy fin pattern such that the 6&6 cell is pan-stackable. According to the other approach, a 1-fin type cell also is provided in a 6&6 cell and is similarly pan-stackable. By contrast, in terms of area/ footprint, a benefit of cell 200B is that cell 200B is 1/6 smaller than the 6&6 cell and yet cell 200B provides the same higher current-capacity as the 6&6 cell. In other words, a benefit of cell 200B is that cell 200B is 5/6 the size of the 6&6 cell.

Figure 2C:
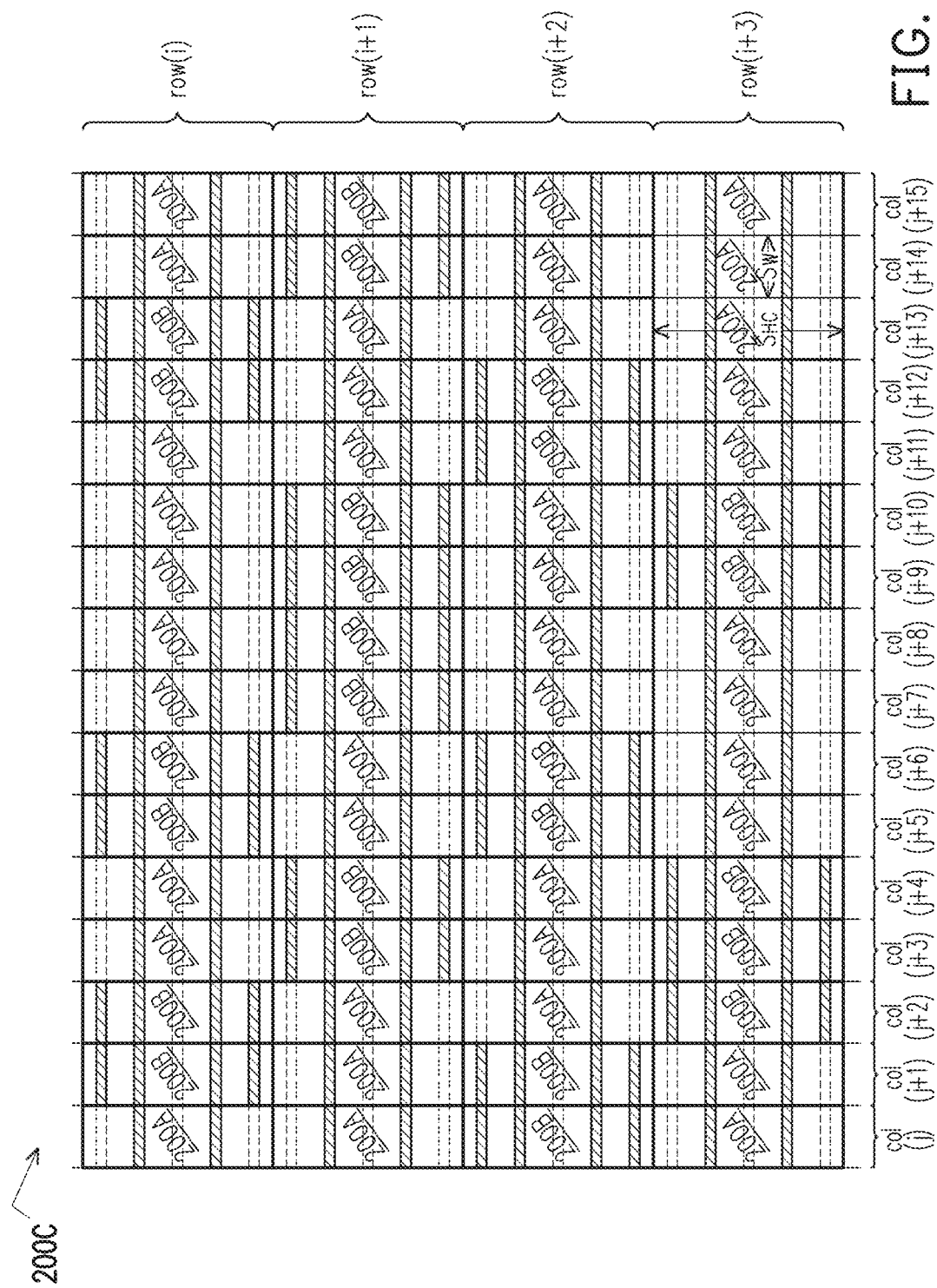
FIG. 2C is a layout diagram of a semiconductor device, in accordance with some embodiments.

FIG. 2C is a layout diagram 200C of a semiconductor device, in accordance with some embodiments.

Layout diagram 200C includes instances of cell 200A and cell 200B. An example of a CMOS semiconductor device resulting from layout diagram 200C is semiconductor device 100 of FIG. 1, wherein cell regions 104A of semiconductor device 100 result from cell 200A and cell regions 104B of semiconductor device 100 result from cells 200B.

Layout diagram 200C is organized into a first grid of rows (of which some are shown in FIG. 2C) and a second grid of columns (of which some are shown in FIG. 2C). Some of the rows of the first grid, namely row(i)-row(i+3), where i is an integer and i≥1, are shown in FIG. 2C. Some of the columns of the second grid, namely col(j)-col(j+15), where j is an integer and j≥1, are shown in FIG. 2C.

In FIG. 2C, rows in the first grid are substantially parallel to the first direction (which in FIGS. 2A-2C is the horizontal direction). In FIG. 2C, in the second direction (which in FIGS. 2A-2C is the vertical direction), there is one size of rows, with each row being at least substantially equal to a first size in the second direction, and with the first size being sufficient to accommodate each of cell 200A and cell 200B. Hence, FIG. 2C shows the first size to be 5 tracks/fin patterns.

In FIG. 2C, columns in the second grid are substantially parallel to the second direction (which in FIGS. 2A-2C is the vertical direction). In some embodiments, a size, $S_{COL}$, of each column in the first direction is an integer multiple of the size $S_W$ of each of cells 200A and 200B such that $S_{COL}=n*S_W=m*(n*Pp)$, where n is an integer and n≥1. In FIG. 2C, n=1 such $S_{COL}=S_W=m*Pp$. In some embodiments, n is a positive integer other than 1.

In layout diagram 200C, among other placements of cells: a first instance of hetero-stackable cell 200B is located/ placed at the intersection of row(i+2) and col(j); a first instance of pan-stackable cell 200A is located/placed at the intersection of row(i+1) and col(j); a second instance of hetero-stackable cell 200B is located/placed at the intersection of row(i) and col(j); and a second instance of pan-stackable cell 200A is located/placed at the intersection of row(i+3) and col(j).

In some embodiments, sizes in the second direction (which in FIGS. 2A-2C is the vertical direction) of the corresponding rows may differ. In some embodiments (not shown), in the second direction, there are two sizes of rows. In some embodiments (not shown), each odd-numbered row is at least substantially equal to a first size in the second direction, the first size being equal to a first number of tracks (again, not shown), and each even-numbered row is at least substantially equal to a second size in the second direction, the second size being equal to a second number of tracks (again, not shown), the second number being different than the first number. For example, in some embodiments, a variation (not shown) of layout diagram 200C of FIG. 2C would retain the size in the second direction of row(i) as 5 tracks/fin patterns, but the size in the second direction of row(i+1) is an odd integer, Q, number of tracks (again, not shown) where Q>5. In such an embodiment, versions of cells 200A and 200B would be sized to fit the size of row(i+1) with the consequence that such versions of cells 200A and 200B would include Q fins.

In some embodiments, in the second direction, there are three sizes of rows. In some embodiments (not shown), each of row(i), row(i+3), row(i+6), . . . , is at least substantially equal to a first size in the second direction, the first size being equal to a first number (S1) of tracks (again, not shown), each of row(i+1), row((i+1)+3), row((i+1)+6), . . . , is at least substantially equal to a second size in the second direction, the second size being equal to a second number (S2) of tracks (again, not shown), and each of row(i+2), row((i+2)+3), row((i+2)+6), . . . , is at least substantially equal to a third size in the second direction, the third size being equal to a third number (S3) of tracks (again, not shown), where each of S1, S2 and S3 is a positive integer, and S1 S2, S1 S3 and S2 S3. In some embodiments (not shown), there are more than three sizes in the second direction of rows.

Figure 3A:
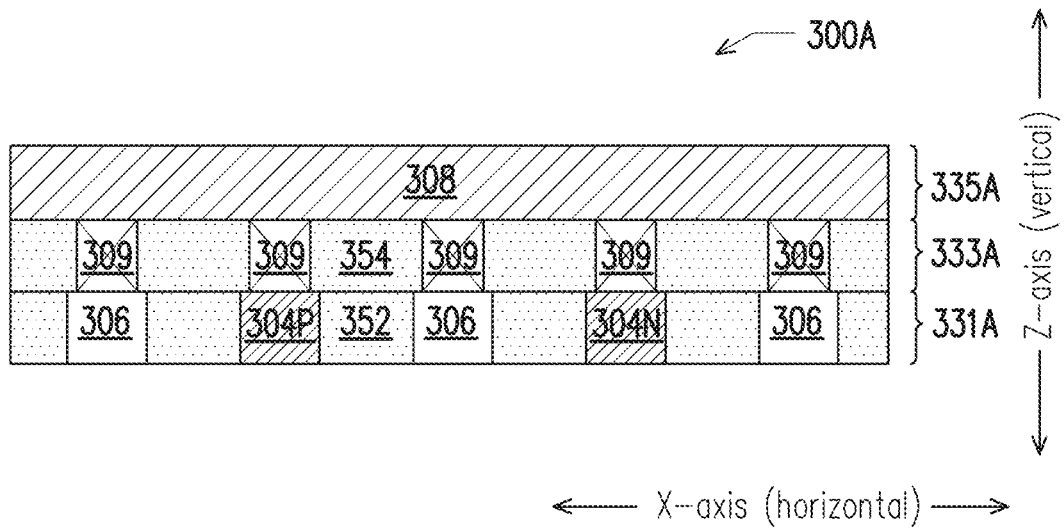
FIG. 3A is a cross-section of a cell region of a semiconductor device, in accordance with some embodiments.

FIG. 3A is a cross-section of a cell region 300A of a semiconductor device, in accordance with some embodiments.

Cell region 300A is an example of a cell region of a semiconductor device which is fabricated based on a layout diagram which includes pan-stackable cell 200A of FIG. 2A. As such, cell region 300A is an example of cell region 104A of semiconductor device 100 of FIG. 1.

Semiconductor device 300A includes a layer 331A, 333A and 335A. Layer 333A is formed on layer 331A. Layer 335A is formed on layer 333A.

Layer 331A includes: active fins 304P and 304N corresponding to fin patterns 204P and 204N of cell 200A; dummy fins 306 corresponding to dummy fin patterns 206 on track(i), track(i+2) and track(i+4); and an interlayer dielectric (ILD) 352. Layer 333A includes: vias 309 aligned correspondingly over active fins 304P and 304N, and over dummy fins 306; and an ILD 354. In some embodiments, vias 309 are not formed over dummy fins 306. Layer 335A includes a gate electrode 308 corresponding to gate pattern 208A in cell 200A.

Figure 3B:
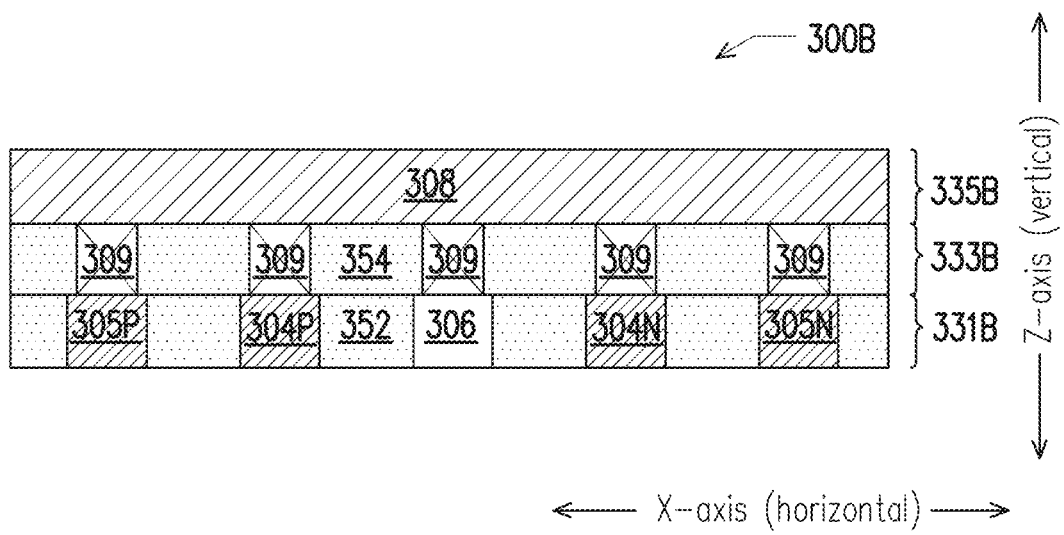
FIG. 3B is a cross-section of a semiconductor device, in accordance with some embodiments.

FIG. 3B is a cross-section of a semiconductor device 300B, in accordance with some embodiments.

Semiconductor device 300B of FIG. 3B is similar to semiconductor device 300A of FIG. 3A. For brevity, the discussion of semiconductor device 300B will focus on differences of semiconductor device 300B with respect to semiconductor device 300A.

Cell region 300B is an example of a cell region of a semiconductor device which is fabricated based on a layout diagram which includes hetero-stackable cell 200B of FIG. 2B. As such, cell region 300B is an example of cell region 104B of semiconductor device 100 of FIG. 1.

In contrast to layer 331A of semiconductor device 300A which includes dummy fins corresponding to fin patterns 206 on track(i+4) and track(i), layer 331B of semiconductor device 300B includes fins 305P and 305N. Fins 305P and 305N corresponding to fin patterns 205P and 205N of cell 200B.

FIG. 4A is a layout diagram 420A, in accordance with some embodiments.

An example of a CMOS semiconductor device resulting from a larger layout diagram which includes layout diagram 420A is semiconductor device 100 of FIG. 1, wherein cell region 104A of semiconductor device 100 results from layout diagram 420A. While layout diagram 420A is designated for CMOS configuration because cell 200A is included therein, in some embodiments, layout diagram 420A is designated for PMOS configuration and not for CMOS configuration. In some embodiments, layout diagram 420A is designated for NMOS configuration and not for CMOS configuration.

Layout diagram 420A includes: cell 200A; and conductive segments of a $q^{th}$ layer of 'metallization' which overlays cell 200A, where q is an integer and q≥0. In some embodiments, the $q^{th}$ layer is the first layer of metallization over cell 200A, in which case q=0 or q=1 depending upon the numbering convention of the corresponding design rules. The conductive segments include: power grid (PG) segments 422A and 424A which are portions of longer corresponding power grid lines; and signal segments 426A, 428A, 430A and 432A, which are portions of longer signal lines. Accordingly, PG segments 422A-424A and signal segments 426A-432A are shown as extending outside of cell 200A in the first direction (which, for consistency with FIG. 2A, is the horizontal direction in FIG. 4A). In some embodiments, PG segment 422A is designated for a voltage VDD. In some embodiments, PG segment 424A is designated for a voltage VSS.

In FIG. 4A, a size in the second direction (which, for consistency with FIG. 2A, is the vertical direction in FIG. 4A) of each of PG segments 422A and 424A is $S_{PG4}$. A size in the second direction of each of signal segments 426A, 428A, 430A and 432A is $S_{42X}$. A pitch between PG segments 422A and 424A is $P_{PG4A}$. PG segment 422A is separated in the second direction from PG segment 424A by a distance gap41 such that gap41=$P_{PG4A}$−$S_{PG4}$. PG segment 422A is separated in the second direction from signal segment 426A by a distance gap43. Similarly, PG segment 424A is separated in the second direction from signal segment 432A by the distance gap43. Signal segments 426A-432A are separated in the second direction from each other by a distance, gap45. Magnitudes of $S_{PG4}$, $S_{42X}$, $P_{PG4A}$, gap41, gap43 and gap45 depend upon the corresponding semiconductor process technology node.

To facilitate stacking pan-stackable cell 200A (which is included in layout diagram 420A) onto hetero-stackable cell 200B (which is included in layout diagram 420B, discussed below), or vice-versa, layout diagram 420A shows asymmetry and various proportions. More particularly, a midline of PG segment 422A has a relationship (in the second direction) to top edge 214A which is different than a relationship (in the second direction) of the midline of PG segment 424A to bottom edge 218A. A midline of PG segment 424A substantially aligns with bottom edge 218A of cell 200A such that PG segment 424A extends (in the second direction) outside cell 200A by a size/distance ½($S_{PG4}$), whereas a midline of PG segment 422A does not substantially align with top edge 214A of cell 200A such that PG segment 422A extends (in the second direction) inside cell 200A by a size/distance $S_{OFF4}$, where ½($S_{PG4}$)<$S_{OFF4}$, thereby representing asymmetry. Within the distance gap41 (by which PG segment 422A is separated in the second direction from PG segment 424A), signal segments 426A-432A are distributed in the second direction such that gap41=4*$S_{42X}$+3*gap45+2*gap43. In some embodiments, layout diagram 420A has a different asymmetry and/or different proportions than are shown in FIG. 4A.

FIG. 4B is a layout diagram 420B, in accordance with some embodiments.

Layout diagram 420B of FIG. 4B is similar to layout diagram 420A of FIG. 4A. For brevity, the discussion of layout diagram 420B will focus on differences of layout diagram 420B with respect to layout diagram 420A. An example of a CMOS semiconductor device resulting from a larger layout diagram which includes layout diagram 420B is semiconductor device 100 of FIG. 1, wherein cell region 104B of semiconductor device 100 results from layout diagram 420B. While layout diagram 420B is designated for CMOS configuration because cell 200B is included therein, in some embodiments, layout diagram 420B is designated for PMOS configuration and not for CMOS configuration. In some embodiments, layout diagram 420B is designated for NMOS configuration and not for CMOS configuration.

Layout diagram 420B includes: cell 200B; and conductive segments of a $q^{th}$ layer of 'metallization' which overlays cell 200B, where q is an integer and q≥0. In some embodiments, the $q^{th}$ layer is the first layer of metallization over cell 200B, in which case q=0 or q=1 depending upon the numbering convention of the corresponding design rules. The conductive segments include: power grid (again, PG) segments 422B and 424B which are portions of longer corresponding power grid lines; and signal segments 426B, 428B, 430B and 432B which are portions of longer signal lines.

In FIG. 4B, a size in the second direction (which, for consistency with FIG. 2B, is the vertical direction in FIG. 4B) of each of PG segments 422B and 424B is $S_{PG4}$, which is the same size as PG segments 422A-424A of layout diagram 420A of FIG. 4A. A size in the second direction of each of signal segments 426B, 428B, 430B and 432B is $S_{42X}$, which is the same size as signal segments 426A-432A of layout diagram 420A. A pitch between PG segments 422B and 424B is $P_{PG4B}$, where $P_{PG4B}$>$P_{PG4A}$, and where $P_{PG4A}$ is the pitch between PG segments 422A and 424A of layout diagram 420A. PG segment 422B is separated in the second direction from PG segment 424B by a distance gap47 such that gap47=$P_{PG4B}$−$S_{PG4}$, and gap47>gap41. PG segment 422B is separated in the second direction from signal segment 426B by a distance gap49, where gap49>gap43, and where gap43 is the distance in the second direction between PG segment 422A and signal segment 426A in layout diagram 420A. Similarly, PG segment 424B is separated in the second direction from signal segment 432B by the distance gap49. Signal segments 426B-432B are separated in the second direction from each other by a distance, gap45, which is the same size as the gap between signal segments 426A-432A of layout diagram 420A. Magnitudes of gap47 and gap49 depend upon the corresponding semiconductor process technology node.

To facilitate stacking pan-stackable cell 200A (which is included in layout diagram 420A) on hetero-stackable cell 200B (which is included in layout diagram 420B), or vice-versa, layout diagram 420B shows asymmetry and various proportions. More particularly, a midline of PG segment 422B has a relationship (in the second direction) to top edge 214B which is different than a relationship (in the second direction) of the midline of PG segment 424B to bottom edge 218B, whereas a midline of PG segment 422B substantially aligns with top edge 214B of cell 200B such that PG segment 422B extends (in the second direction) outside cell 200B by a size/distance ½/($S_{PG4}$), thereby representing asymmetry. A midline of PG segment 424B does not substantially align with bottom edge 218B of cell 200B such that PG segment 424B extends (in the second direction) outside cell 200B by a size/distance $S_{OFF4}$, where ½($S_{PG4}$)<$S_{OFF4}$. Within the distance gap47 (by which PG segment 422B is separated in the second direction from PG segment 424B), signal segments 426B-432B are distributed in the second direction such that gap47=4*$S_{42X}$+

3*gap45+2*gap49. In some embodiments, layout diagram 420B has a different asymmetry and/or different proportions than are shown in FIG. 4B.

Figure 4C:
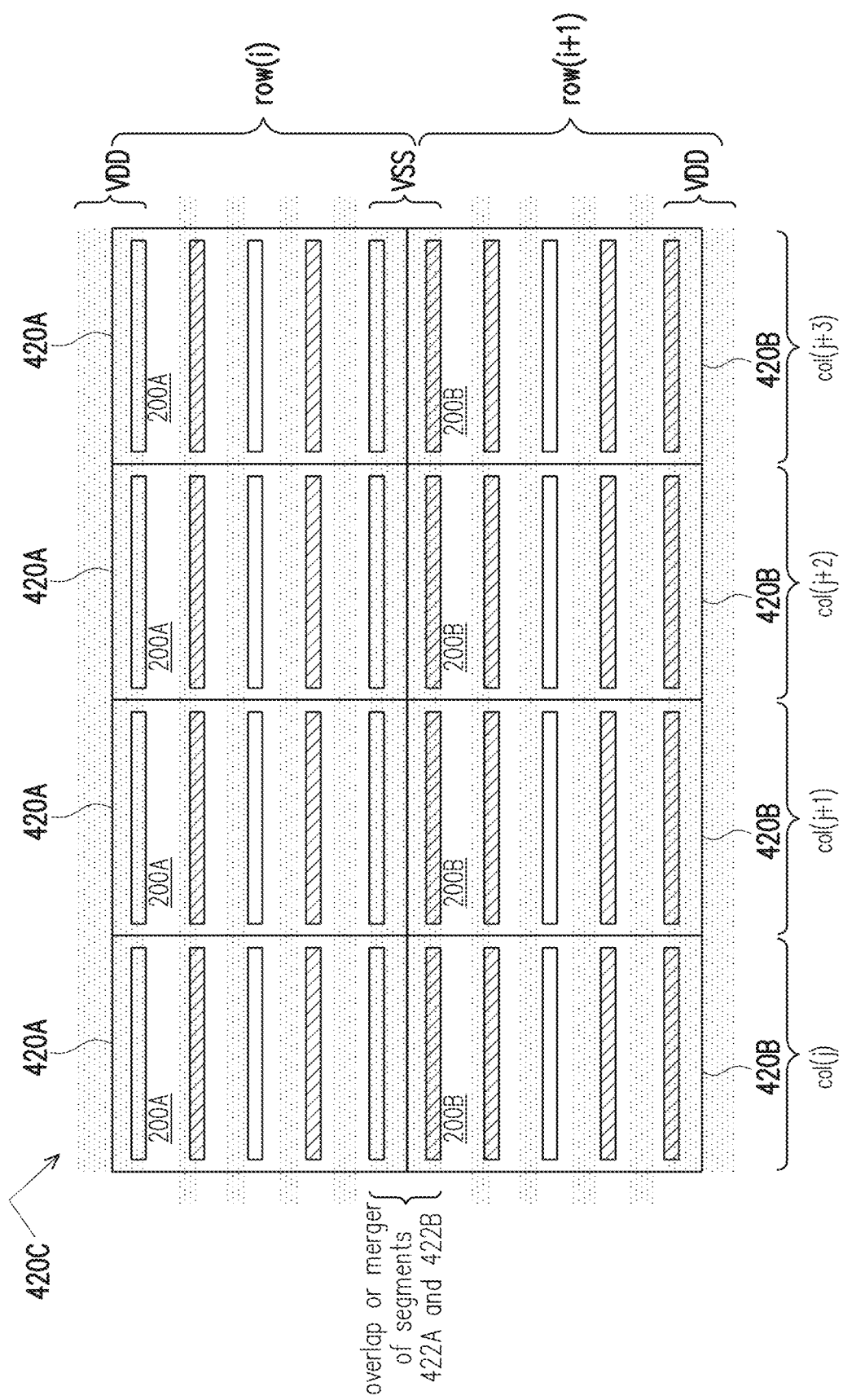
FIG. 4C is a layout diagram of a semiconductor device, in accordance with some embodiments.

FIG. 4C is a layout diagram 420C of a semiconductor device, in accordance with some embodiments.

Layout diagram 420C includes instances of layout diagram 420A and 420B. An example of a CMOS semiconductor device resulting from layout diagram 420C is semiconductor device 100 of FIG. 1.

Layout diagram 420C is organized into a first grid of rows (of which some are shown in FIG. 4C) and a second grid of columns (of which some are shown in FIG. 4C). Some of the rows of the first grid, namely row(i)-row(i+1), where i is an integer and i≥1, are shown in FIG. 4C. Some of the columns of the second grid, namely col(j)-col(j+3), where j is an integer and j≥1, are shown in FIG. 4C.

In FIG. 4C, rows in the first grid are substantially parallel to the first direction (which in FIGS. 2A-2C and 4A-4C is the horizontal direction). A size in the second direction (which in FIGS. 2A-2C and 4A-4C is the vertical direction) of each row is sufficient to accommodate cell 200A (included in layout diagram 420A) or cell 200B (included in layout diagram 420B). Hence, the size of each row in the second direction is 5 tracks/fin patterns.

In FIG. 4C, columns in the second grid are substantially parallel to the second direction (which in FIGS. 2A-2C and 4A-4C is the vertical direction). In some embodiments, a size, $S_{COL}$, of each column in the first direction (which in FIGS. 2A-2C and 4A-4C is the horizontal direction) is an integer multiple of the size $S_W$ of each of cells 200A and 200B such that $S_{COL}=n*S_W=m*(n*Pp)$, where n is an integer and n≥1. In FIG. 2C, n=1 such $S_{COL}=S_W=m*Pp$. In some embodiments, n is a positive integer other than 1.

In layout diagram 420C, among other placements: instances of layout diagram 420A are located/placed at the intersections of row(i) and corresponding col(j)-col(j+3); and instances of layout diagram 420B are located/placed at the intersections of row(i+1) and corresponding col(j)-col(j+3). As a benefit, the asymmetries in each of layout diagrams 420A and 420B, discussed above, facilitate stacking of layout diagram 420A on layout diagram 420B, and vice-versa. Due to the asymmetries in each of layout diagrams 420A and 420B, discussed above, and on a column-by-column basis, PG segment 424A in each instance of layout diagram 420A substantially aligns with PG segment 422B in each instance of layout diagram 420B. In FIG. 4C, the overlapping instances of PG segments 424A and 422B are designated for voltage VSS. In FIG. 4C, instances of PG segment 422A in layout diagram 420A and PG segment 424B in layout diagram 420B are designated for voltage VDD. In some embodiments, the overlapping instances of PG segments 424A and 422B are designated for a voltage other than VSS. In FIG. 4C, instances of PG segments 422A and 424B in layout diagram 420B are designated for voltage VDD. In some embodiments, instances of layout diagram 420B are stacked on corresponding instances of layout diagram 420A.

In some embodiments, as size in the second direction (which in FIGS. 2A-2C and 4A-4C is the vertical direction) of the rows may differ. For example, the size in the second direction of row(i+1) might be an odd integer, Q, number of tracks (not shown) where Q>5. In such an embodiment, a version of cell 200B (which is included in layout diagram 420B) would be sized to fit the size of row(i+1) with the consequence that such a version of cell 200B would include Q fins.

FIG. 5A is a layout diagram 520A, in accordance with some embodiments.

An example of a CMOS semiconductor device resulting from a larger layout diagram which includes layout diagram 520A is semiconductor device 100 of FIG. 1, wherein cell region 104A of semiconductor device 100 results from layout diagram 520A. While layout diagram 520A is designated for CMOS configuration because cell 200A is included therein, in some embodiments, layout diagram 520A is designated for PMOS configuration and not for CMOS configuration. In some embodiments, layout diagram 520A is designated for NMOS configuration and not for CMOS configuration.

Layout diagram 520A includes: cell 200A; and conductive segments of a $q^{th}$ layer of 'metallization' which overlays cell 200A, where q is an integer and q≥0. In some embodiments, the $q^{th}$ layer is the first layer of metallization over cell 200A, in which case q=0 or q=1 depending upon the numbering convention of the corresponding design rules. The conductive segments include: PG segments 522A and 524A which are portions of longer corresponding power grid lines; and signal segments 526A, 528A and 530A, which are portions of longer signal lines. Accordingly, PG segments 522A-524A and signal segments 526A-530A are shown as extending outside of cell 200A in the first direction (which, for consistency with FIG. 2A, is the horizontal direction in FIG. 5A). In some embodiments, PG segment 522A is designated for VDD. In some embodiments, PG segment 524A is designated for VSS.

In FIG. 5A, a size in the second direction (which, for consistency with FIG. 2A, is the vertical direction in FIG. 5A) of each of PG segments 522A and 524A is $S_{PG5}$. It is noted that $S_{PG5}$ of FIG. 5A is greater than $S_{PG4}$ of FIGS. 4A-4B such that $S_{PG}5 > S_{PG4}$. A size in the second direction of each of signal segments 526A, 528A and 530A is $S_{52X}$. It is noted that $S_{52X}$ of FIG. 5A is equal to $S_{42X}$ of FIGS. 4A-4B such that $S_{52X}=S_{42X}$. In some embodiments, that $S_{52X}$ $S_{42X}$. A pitch between PG segments 522A and 524A is $P_{PG5A}$. PG segment 522A is separated in the second direction from PG segment 524A by a distance gap51 such that gap51=$P_{PG5A}$-$S_{PG5}$. PG segment 522A is separated in the second direction from signal segment 526A by a distance gap53. Similarly, PG segment 524A is separated in the second direction from signal segment 530A by the distance gap53. Signal segments 526A-530A are separated in the second direction from each other by a distance, gap55. Magnitudes of $S_{PG5}$, $S_{52X}$ and $P_{PG5A}$, gap51, gap53 and gap55 depend upon the corresponding semiconductor process technology node.

To facilitate stacking pan-stackable cell 200A (which is included in layout diagram 520A) onto hetero-stackable cell 200B (which is included in layout diagram 520B, discussed below), or vice-versa, layout diagram 520A shows asymmetry and various proportions. More particularly, a midline of PG segment 522A has a relationship in the second direction (which, for consistency with FIGS. 2A-2C, is the vertical direction in FIG. 5A) to top edge 214A which is different than a relationship (in the second direction) of the midline of PG segment 524A to bottom edge 218A, thereby representing asymmetry. A midline of PG segment 524A substantially aligns with bottom edge 218A of cell 200A such that PG segment 524A extends (in the second direction) outside cell 200A by a size/distance ½($S_{PG5}$). A midline of PG segment 522A does not substantially align with top edge 214A of cell 200A such that PG segment 522A extends (in the second direction) inside cell 200A by a size/distance $S_{OFF5}$, where ½($S_{PG5}$)<$S_{OFF5}$. Within the distance gap51 (by which PG segment 522A is separated in the second direction from PG segment 524A), signal segments 526A-530A are distributed in the second direction such that gap51=3*$S_{52X}$+2*gap55+2*gap53. In some embodiments, layout diagram 520A has a different asymmetry and/or different proportions than are shown in FIG. 5A.

FIG. 5B is a layout diagram 520B, in accordance with some embodiments.

Layout diagram 520B of FIG. 5B is similar to layout diagram 520A of FIG. 5A. For brevity, the discussion of layout diagram 520B will focus on differences of layout diagram 520B with respect to layout diagram 520A. An example of a CMOS semiconductor device resulting from a larger layout diagram which includes layout diagram 520B is semiconductor device 100 of FIG. 1, wherein cell region 104B of semiconductor device 100 results from layout diagram 520B. While layout diagram 520B is designated for CMOS configuration because cell 200B is included therein, in some embodiments, layout diagram 520B is designated for PMOS configuration and not for CMOS configuration. In some embodiments, layout diagram 520B is designated for NMOS configuration and not for CMOS configuration.

Layout diagram 520B includes: cell 200B; and conductive segments of a $q^{th}$ layer of 'metallization' which overlays cell 200B, where q is an integer and q≥0. In some embodiments, the $q^{th}$ layer is the first layer of metallization over cell 200B, in which case q=0 or q=1 depending upon the numbering convention of the corresponding design rules. The conductive segments include: PG segments 522B and 524B which are portions of longer corresponding power grid lines; and signal segments 526B, 528B, 530B and 532B which are portions of longer signal lines.

In FIG. 5B, a size in the second direction (which, for consistency with FIG. 2B, is the vertical direction in FIG. 5B) of each of PG segments 522B and 524B is $S_{PG5}$, which is the same size as PG segments 522A-524A of layout diagram 520A of FIG. 5A. A size in the second direction of each of signal segments 526B, 528B, 530B and 532B is $S_{52X}$, which is the same size as signal segments 526A-530A of layout diagram 520A. A pitch between PG segments 522B and 524B is $P_{PG5B}$, where $P_{PG5B}>P_{PG5A}$, and where $P_{PG5A}$ is shown in FIG. 5A. PG segment 522B is separated in the second direction from PG segment 524B by a distance gap57 such that gap57=$P_{PG5B}$-$S_{PG5}$, and gap57>gap51, where (again) gap51 is shown in FIG. 5A. PG segment 522B is separated in the second direction from signal segment 526B by a distance gap59, where gap59>gap53, and where gap53 is shown in FIG. 5A. Similarly, PG segment 524B is separated in the second direction from signal segment 532B by the distance gap59. Signal segments 526B-532B are separated in the second direction from each other by a distance, gap61, which is the same size as gap55 between signal segments 526A-530A of layout diagram 520A. In some embodiments, gap59=gap61. Magnitudes of gap57, gap59 and gap61 depend upon the corresponding semiconductor process technology node.

To facilitate stacking pan-stackable cell 200A (which is included in layout diagram 520A) on hetero-stackable cell 200B (which is included in layout diagram 520B), or vice-versa, layout diagram 520B shows asymmetry and various proportions. More particularly, a midline of PG segment 522B has a relationship in the second direction (which, for consistency with FIGS. 2A-2C and 5A, is the vertical direction in FIG. 5A) to top edge 214B which is different than a relationship (in the second direction) of the midline of PG segment 524B to bottom edge 218B. A midline of PG segment 522B substantially aligns with top edge 214B of cell 200B such that PG segment 522B extends (in the second direction) outside cell 200B by a size/distance ½($S_{PG5}$). A midline of PG segment 524B does not substantially align with bottom edge 218B of cell 200B such that PG segment 524B extends (in the second direction) outside cell 200B by a size/distance $S_{OFF5}$, where ½($S_{PG5}$)<$S_{OFF5}$. Within the distance gap57 (by which PG segment 522B is separated in the second direction from PG segment 524B), signal segments 526B-532B are distributed in the second direction such that gap57=4*$S_{52X}$+3*gap61+2*gap59. In some embodiments, layout diagram 520B has a different asymmetry and/or different proportions than are shown in FIG. 5B.

When considered as a pair of layout diagrams, the pairing of layout diagrams 520A-520B contrasts with the pairing of layout diagrams 420A-420B, and vice-versa. For example, the pairing of layout diagrams 520A-520B better facilitates the use of larger PG segments than the pairing of layout diagrams 420A-420B because $S_{PG5}>S_{PG4}$. Also, for example, the pairing of layout diagrams 420A-420B better facilitates signal routability than the pairing of layout diagrams 520A-520B because both of layout diagrams 420A and 420B accommodate four signal segments (signal segments 426A, 428A, 430A and 432A in layout diagram 420A and signal segments 426B, 428B, 430B and 432B in layout diagram 420B) whereas layout diagram 520B accommodates four signal segments 526B, 528B, 530B and 532B but layout diagram 520A accommodates three signal segments 526A, 528A and 530A.

Figure 5C:
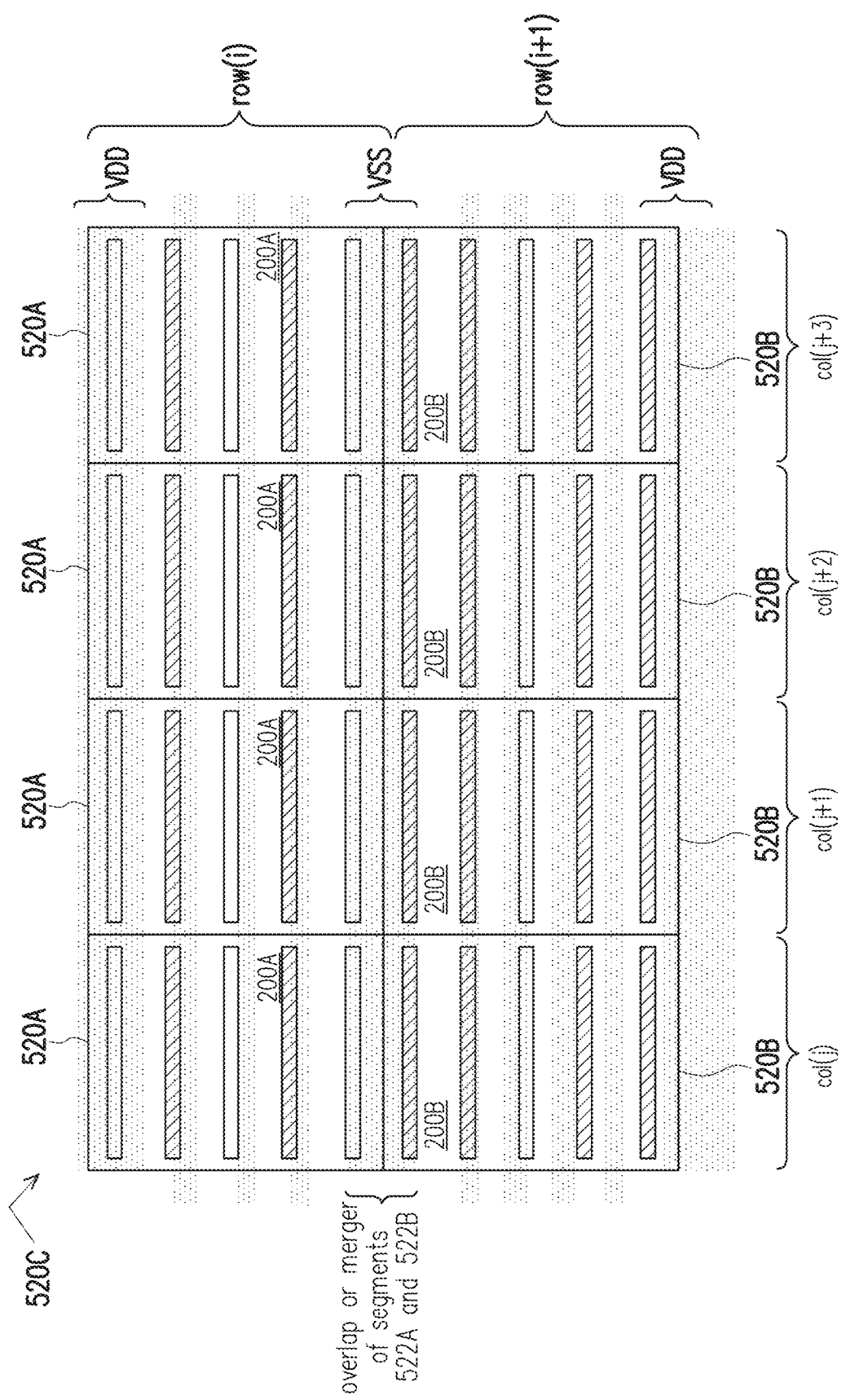
FIG. 5C is a layout diagram of a semiconductor device, in accordance with some embodiments.

FIG. 5C is a layout diagram 520C of a semiconductor device, in accordance with some embodiments.

Layout diagram 520C includes instances of layout diagram 520A and 520B. An example of a CMOS semiconductor device resulting from layout diagram 520C is semiconductor device 100 of FIG. 1.

Layout diagram 520C is organized into a first grid of rows (of which some are shown in FIG. 5C) and a second grid of columns (of which some are shown in FIG. 5C). Some of the rows of the first grid, namely row(i)-row(i+1), where i is an integer and i≥1, are shown in FIG. 5C. Some of the columns of the second grid, namely col(j)-col(j+3), where j is an integer and j≥1, are shown in FIG. 5C.

In FIG. 5C, rows in the first grid are substantially parallel to the first direction (which in FIGS. 2A-2C and 5A-5C is the horizontal direction). A size in the second direction (which in FIGS. 2A-2C and 5A-5C is the vertical direction) of each row is sufficient to accommodate cell 200A (included in layout diagram 520A) or cell 200B (included in layout diagram 520B). Hence, the size of each row in the second direction is 5 tracks/fin patterns.

In FIG. 5C, columns in the second grid are substantially parallel to the second direction (which in FIGS. 2A-2C and 5A-5C is the vertical direction). In some embodiments, a size, $S_{COL}$, of each column in the first direction (which in FIGS. 2A-2C and 5A-5C is the horizontal direction) is an integer multiple of the size $S_W$ of each of cells 200A and 200B such that $S_{COL}$=n*$S_W$=m*(n*Pp), where n is an integer and n≥1. In FIG. 2C, n=1 such $S_{COL}$=$S_W$=m*Pp. In some embodiments, n is a positive integer other than 1.

In layout diagram 520C, among other placements: instances of layout diagram 520A are located/placed at the intersections of row(i) and corresponding col(j)-col(j+3); and instances of layout diagram 520B are located/placed at the intersections of row(i+1) and corresponding col(j)-col(j+3). As a benefit, the asymmetries in each of layout diagrams 520A and 520B, discussed above, facilitate stacking of layout diagram 520A on layout diagram 520B, and vice-versa. Due to the asymmetries in each of layout diagrams 520A and 520B, discussed above, and on a column-by-column basis, PG segment 524A in each instance of layout diagram 520A substantially aligns with PG segment 522B in each instance of layout diagram 520B. In FIG. 5C, the overlapping instances of PG segments 524A and 522B are designated for voltage VSS. In FIG. 5C, instances of PG segment 522A in layout diagram 520A and PG segment 524B in layout diagram 520B are designated for voltage VDD. In some embodiments, the overlapping instances of PG segments 524A and 522B are designated for a voltage other than VSS. In FIG. 5C, instances of PG segments 522A and 524B in layout diagram 520B are designated for voltage VDD. In some embodiments, instances of layout diagram 520B are stacked on corresponding instances of layout diagram 520A.

In some embodiments, as size in the second direction (which in FIGS. 2A-2C and 5A-5C is the vertical direction) of the rows may differ. For example, the size in the second direction of row(i+1) might be an odd integer, Q, number of tracks (not shown) where Q>5. In such an embodiment, a version of cell 200B (which is included in layout diagram 520B) would be sized to fit the size of row(i+1) with the consequence that such a version of cell 200B would include Q fins.

FIG. 6 is a flowchart of a method 600 of generating a layout, in accordance with some embodiments. In some embodiments, method 600 is used to generate an instance of layout diagram 200C, 420C, 520C, or the like. Method 600 is applicable to generating other instances of layout diagrams which include cells 200A-200B. Method 600 is implementable, for example, using EDA system 1000 (FIG. 10), in accordance with some embodiments.

FIGS. 7A-7C are corresponding layout diagrams 702-706 in accordance with some embodiments. Layout diagram 704 of FIG. 7B is a version of layout diagram 702 of FIG. 7A which has been populated with some cells. Layout diagram 706 of FIG. 7C is a version of layout diagram 704 of FIG. 7B which has been populated with additional cells. FIGS. 7A-7C will be discussed in more detail in the context of the discussion of FIG. 6.

Returning to FIG. 6, method 600 includes blocks 602-606. At block 602, a layout diagram is organized into a grid of even and odd, single-cell-height rows which are substantially parallel to a first direction (e.g., the horizontal direction), wherein, for row(i), i is an integer and i ≥1. An example of such a layout diagram is layout diagram 702 of FIG. 7A. It is noted that layout diagram 702 is simplified for simplicity and brevity of description. In some embodiments, layout diagram 702 includes a different number of rows. In some embodiments, each of the rows in layout diagram 702 has a size in the first direction which different than what is shown in FIG. 7A. In some embodiments, each of the rows in layout diagram 702 has a size in the second direction which is different than what is shown in FIG. 7A. From block 602, flow proceeds to block 604.

At block 604, one or more hetero-stackable cells are placed in corresponding locations in corresponding rows of the grid. In particular, the one or more cells are placed such that, for a given hetero-stackable cell in row(i+1), there is no hetero-stackable cell in row(i) or row(i+2) which, relative to a second direction (e.g., the vertical direction), overlaps the given hetero-stackable cell. Examples of the hetero-stackable cells are hetero-stackable cells 700B in FIG. 7B. Hetero-stackable cells 700B correspond, e.g., to hetero-stackable cells 200B of FIG. 2B. In FIG. 7B, an instance of hetero-stackable cell 700B is located in row 2 albeit without another instance of hetero-stackable cell 700B being located in row 1 or row 3. Also in FIG. 7B, two instances of hetero-stackable cell 700B are located immediately next to each other in row 4 albeit without another instance of hetero-stackable cell 700B being located in row 3 or row 5. If an additional instance of hetero-stackable cell 700B were to be located, e.g., in row 3, then the additional instance of hetero-stackable cell 700B should be placed in a location in row 3 such that the additional instance of hetero-stackable cell 700B would not overlap, relative to the second direction, the one instance of hetero-stackable cell 700B in row 2 and the two instances of hetero-stackable cell 700B in row 4. From block 604, flow proceeds to block 606.

At block 606, one or more pan-stackable cells are place in placed in corresponding locations in corresponding rows of the grid. Examples of the pan-stackable cells are pan-stackable cells 700A in FIG. 7C. Pan-stackable cells 700A correspond, e.g., to pan-stackable cells 200A of FIG. 2A. Because of being pan-stackable, an instance of cell 700A can be placed in a row so as to overlap, relative to the second direction, another instance of pan-stackable cell 700A or an instance of hetero-stackable cell 700B. In FIG. 7C, one instance of pan-stackable cell 700A is located in row 3 such that, relative to the second direction, the one instance of pan-stackable cell 700A in row 3 overlaps one instance of hetero-stackable cell 700B in row 2, one instance of pan-stackable cell 700A in row 2, two instances of hetero-stackable cell 700B in row 4 and one instance of pan-stackable cell 700A in row 4.

Figure 8:
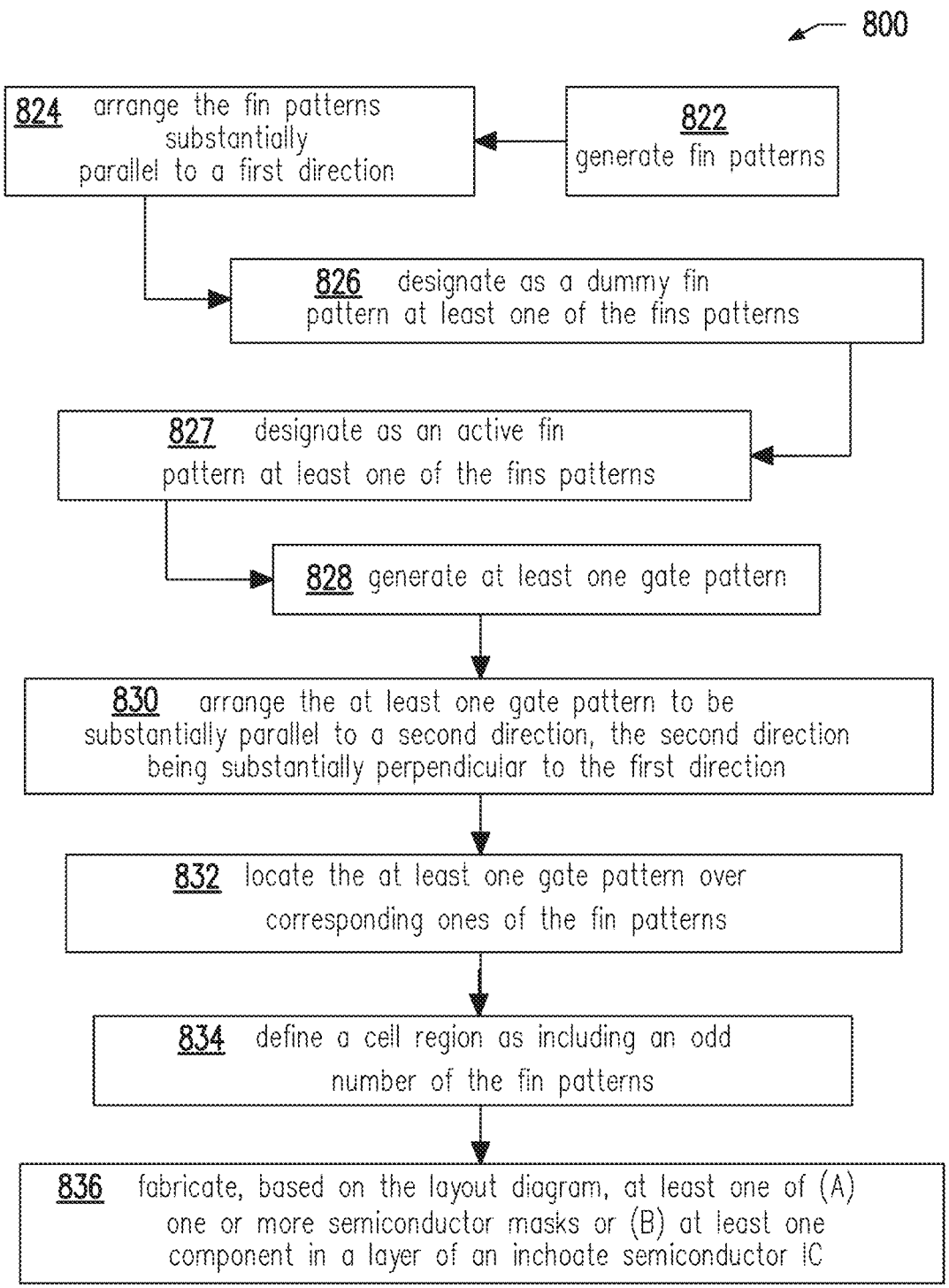
FIG. 8 is a flowchart of a method of generating a layout diagram of a standard cell, in accordance with some embodiments.

FIG. 8 is a flowchart of a method 800 of generating a layout diagram of a standard cell, in accordance with some embodiments.

Method 800 is implementable, for example, using EDA system 1000 (FIG. 10), in accordance with some embodiments. In some embodiments, method 800 is used to generate a layout diagram of a pan-stackable cell. In some embodiments, method 800 is used to generate a layout diagram of an odd-fin height, standard pan-stackable cell. An example of an odd-fin height, standard pan-stackable cell is cell 200A of FIG. 2A. In some embodiments, method 800 is used to generate a layout diagram of a hetero-stackable cell. In some embodiments, method 800 is used to generate a layout diagram of an odd-fin height, standard hetero-stackable cell. An example of an odd-fin height, standard hetero-stackable cell is cell 200B of FIG. 2B. In some embodiments, method 800 is used to generate a layout diagram of another standard cell.

In FIG. 8, method 800 includes blocks 822-836. At block 822, fin patterns are generated. Examples of fin patterns in a pan-stackable cell are fin patterns 204N, 204P and 206 in pan-stackable cell 200A. Examples of fin patterns in a hetero-stackable cells are fin patterns 204N, 204P, 205N, 205P and 206 in cell 200B. From block 822, flow proceeds to block 824. At block 824, the fin patterns are arranged substantially parallel to a first direction. In the examples of pan-stackable cell 200A in FIG. 2A and hetero-stackable cell 200B in FIG. 2B, the first direction is horizontal. From block 824, flow proceeds to a block 826. At block 826, at least one of the fin patterns is designated as a dummy fin pattern. In the example of pan-stackable cell 200A, fin patterns 206 on track(i), track(i+2) and track(i+4) are dummy fin patterns. In the example of hetero-stackable cell 200B in FIG. 2B, fin pattern 206 on track(i+2) is a dummy fin pattern. From block 826, flow proceeds to block 827.

At block 827 of FIG. 8, at least one of the fin patterns is designated as an active fin pattern. In the example of pan-stackable cell 200A of FIG. 2A, fin patterns 204N and 204P are active fin patterns. In the example of hetero-stackable cell 200B in FIG. 2B, fin patterns 204N, 204P, 205N and 205P are designated as active fin patterns. From block 827, flow proceeds to block 828. At block 828, at least one gate pattern is generated (828). Examples of gate patterns are gate pattern 208A in pan-stackable cell 200A and gate pattern 208B in hetero-stackable cell 200B.

From block 828, flow proceeds to block 830. At block 830, the at least one gate pattern is arranged to be substantially parallel to a second direction, the second direction being substantially perpendicular to the first direction. In the examples of pan-stackable cell 200A in FIG. 2A and hetero-stackable cell 200B in FIG. 2B, the second direction is vertical. From block 830, flow proceeds to block 832. At block 832, In the example of pan-stackable cell 200A, gate pattern 208A is located over fin patterns 204N, 204P and 206. In the example of hetero-stackable cell 200B, gate pattern 208B is located over fin patterns 204N, 204P, 205N, 205P and 206. From block 832, flow proceeds to block 834. At block 834, a cell is defined as including an odd number of the fin patterns. Each of the examples of cell 200A and cell 200B includes an odd number of fin patterns. From block 834, flow proceeds to block 836. At block 836, based on the layout, at least one of (A) one or more semiconductor masks or (B) at least one component in a layer of an inchoate semiconductor integrated circuit is fabricated. See discussion of FIG. 10, below.

In some embodiments, block 834 of FIG. 8 includes: setting a place-and-route (PR) boundary of the cell to be substantially rectangular; arranging first and second edges of the PR boundary to be substantially parallel to the first direction; and locating the first and second edges so that neither of the first and second edges overlaps any of the fin patterns. Examples of the PR boundary include PR boundary 210A of cell 200A of FIG. 2A and PR boundary 210B of cell 200B of FIG. 2B. Examples of the first and second edges include top edge 214A and bottom edge 218A of PR boundary 210A of cell 200A, and top edge 214B and bottom edge 218B of PR boundary 210B of cell 200B. In the example of cell 200A, none of fins 204N, 204P and 206 overlaps top edge 214A nor bottom edge 218A. In the example of cell 200B, none of fins 204N, 204P, 205N, 205P and 206 overlaps top edge 214B nor bottom edge 218B.

In some embodiments, block 834 of FIG. 8 includes configuring the cell to include 5 fin patterns. Each of the examples of cell 200A of FIG. 2A and cell 200B of FIG. 2B includes 5 fin patterns. In some embodiments, block 834 further includes: designating at least 2 of the 5 fin patterns as active fin patterns. In the example of cell 200A, fin patterns 204N and 204P are designated as active fin patterns. In some embodiments, block 834 further includes: designating at least 4 of the 5 fin patterns as active fin patterns. In the example of cell 200B, fin patterns 204N, 204P, 205N and 205P are designated as active fin patterns.

In some embodiments, block 834 of FIG. 8 includes configuring the cell, relative to stacking in the second direction, to be pan-stackable. The example of cell 200A of FIG. 2A is pan-stackable.

In some embodiments, block 834 of FIG. 8 includes configuring the cell, relative to stacking in the second direction, to be hetero-stackable. The example of cell 200B of FIG. 2B is hetero-stackable.

Figure 9:
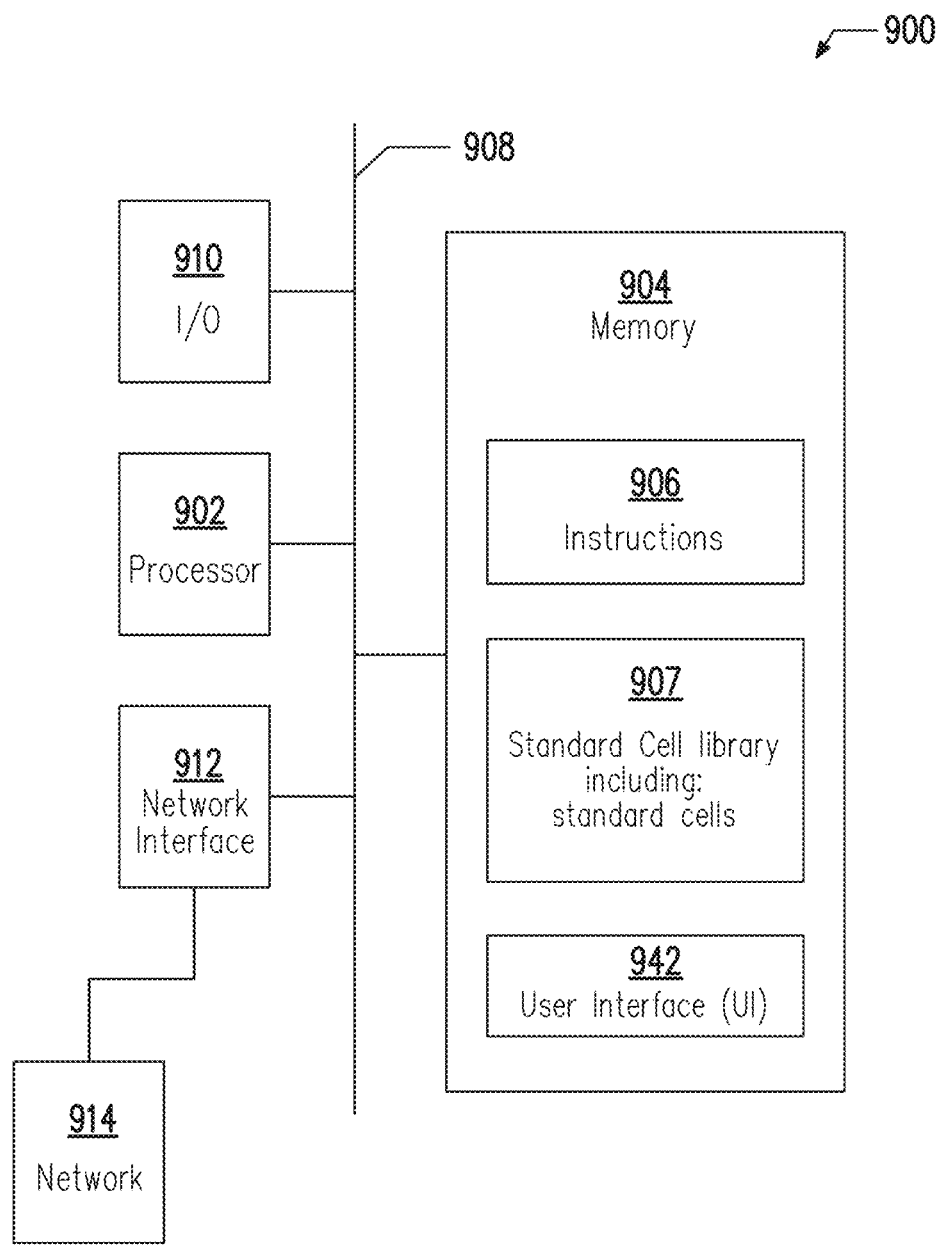
FIG. 9 is a block diagram of an electronic design automation (EDA) system in accordance with some embodiments.

FIG. 9 is a block diagram of an electronic design automation (EDA) system 900 in accordance with some embodiments.

In some embodiments, EDA system 900 includes an APR system. Method 600 of FIG. 6 and/or method 800 of FIG. 8 is implementable, for example, using EDA system 900, in accordance with some embodiments.

In some embodiments, EDA system 900 is a general purpose computing device including a hardware processor 902 and a non-transitory, computer-readable storage medium 904. Storage medium 904, amongst other things, is encoded with, i.e., stores, computer program code 906, i.e., a set of executable instructions. Execution of instructions 906 by hardware processor 902 represents (at least in part) an EDA tool which implements a portion or all of, e.g., the method of FIG. 6, in accordance with one or more embodiments (hereinafter, the noted processes and/or methods).

Processor 902 is electrically coupled to computer-readable storage medium 904 via a bus 908. Processor 902 is also electrically coupled to an I/O interface 910 by bus 908. A network interface 912 is also electrically connected to processor 902 via bus 908. Network interface 912 is connected to a network 914, so that processor 902 and computer-readable storage medium 904 are capable of connecting to external elements via network 914. Processor 902 is configured to execute computer program code 906 encoded in computer-readable storage medium 904 in order to cause system 900 to be usable for performing a portion or all of the noted processes and/or methods. In one or more embodiments, processor 902 is a central processing unit (CPU), a multi-processor, a distributed processing system, an application specific integrated circuit (ASIC), and/or a suitable processing unit.

In one or more embodiments, computer-readable storage medium 904 is an electronic, magnetic, optical, electromagnetic, infrared, and/or a semiconductor system (or apparatus or device). For example, computer-readable storage medium 904 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 904 includes a compact disk-read only memory (CD-ROM), a compact disk-read/write (CD-R/W), and/or a digital video disc (DVD).

In one or more embodiments, storage medium 904 stores computer program code 906 configured to cause system 900 (where such execution represents (at least in part) the EDA tool) to be usable for performing a portion or all of the noted processes and/or methods. In one or more embodiments, storage medium 904 also stores information which facilitates performing a portion or all of the noted processes and/or methods. In one or more embodiments, storage medium 904 stores library 907 of standard cells including such standard cells as disclosed herein.

EDA system 900 includes I/O interface 910. I/O interface 910 is coupled to external circuitry. In one or more embodiments, I/O interface 910 includes a keyboard, keypad, mouse, trackball, trackpad, touchscreen, and/or cursor direction keys for communicating information and commands to processor 902.

EDA system 900 also includes network interface 912 coupled to processor 902. Network interface 912 allows system 900 to communicate with network 914, to which one or more other computer systems are connected. Network interface 912 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 900.

System 900 is configured to receive information through I/O interface 910. The information received through I/O interface 910 includes one or more of instructions, data, design rules, libraries of standard cells, and/or other parameters for processing by processor 902. The information is transferred to processor 902 via bus 908. EDA system 900 is configured to receive information related to a UI through I/O interface 910. The information is stored in computer-readable medium 904 as user interface (UI) 942.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 900. In some embodiments, a layout which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 10:
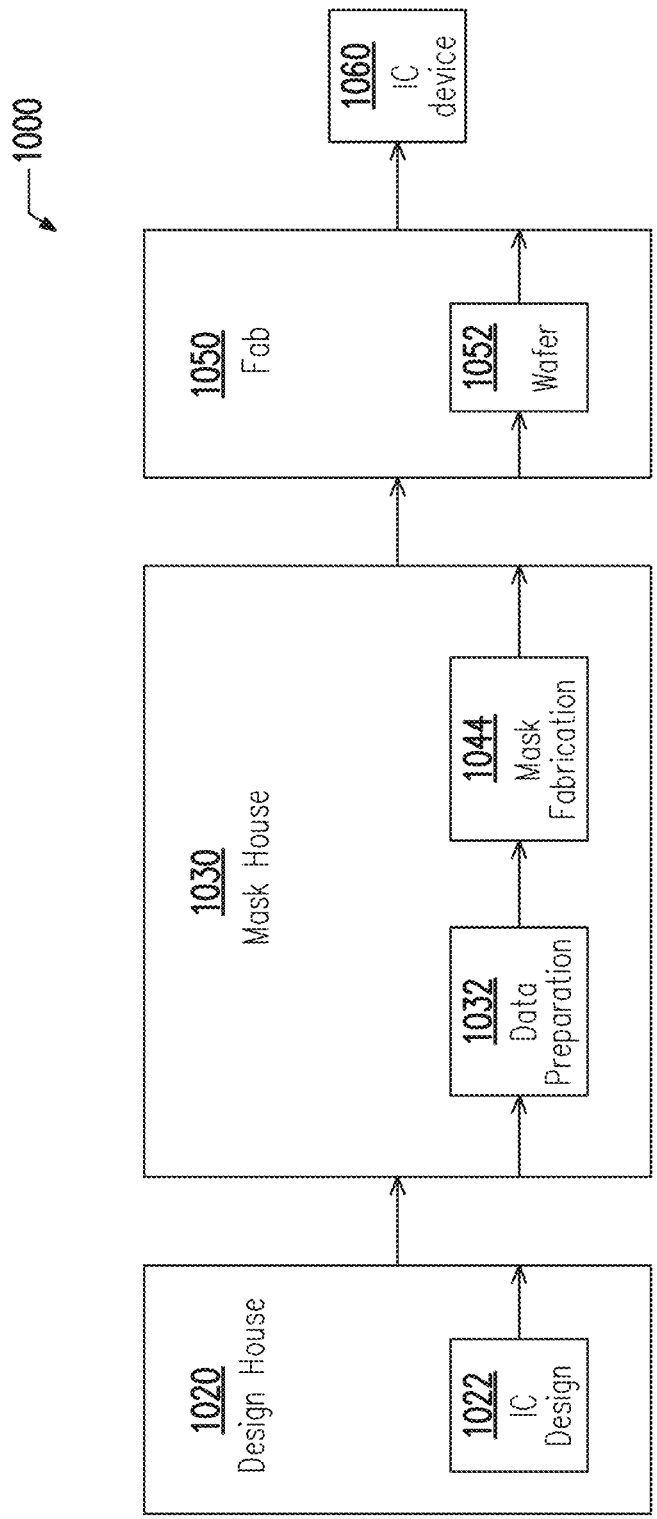
FIG. 10 is a block diagram of an integrated circuit (IC) manufacturing system, and an IC manufacturing flow associated therewith, in accordance with some embodiments.

FIG. 10 is a block diagram of an integrated circuit (IC) manufacturing system 1000, and an IC manufacturing flow associated therewith, in accordance with some embodiments. In some embodiments, based on a layout diagram, at least one of (A) one or more semiconductor masks or (B) at least one component in a layer of an inchoate semiconductor integrated circuit is fabricated using manufacturing system 1000.

In FIG. 10, IC manufacturing system 1000 includes entities, such as a design house 1020, a mask house 1030, and an IC manufacturer/fabricator ("fab") 1050, that interact with one another in the design, development, and manufacturing cycles and/or services related to manufacturing an IC device 1060. The entities in system 1000 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 1020, mask house 1030, and IC fab 1050 is owned by a single larger company. In some embodiments, two or more of design house 1020, mask house 1030, and IC fab 1050 coexist in a common facility and use common resources.

Design house (or design team) 1020 generates an IC design layout 1022. IC design layout 1022 includes various geometrical patterns designed for an IC device 1060. The geometrical patterns correspond to patterns of metal, oxide, or semiconductor layers that make up the various components of IC device 1060 to be fabricated. The various layers combine to form various IC features. For example, a portion of IC design layout 1022 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 1020 implements a proper design procedure to form IC design layout 1022. The design procedure includes one or more of logic design, physical design or place and route. IC design layout 1022 is presented in one or more data files having information of the geometrical patterns. For example, IC design layout 1022 can be expressed in a GDSII file format or DFII file format.

Mask house 1030 includes data preparation 1032 and mask fabrication 1044. Mask house 1030 uses IC design layout 1022 to manufacture one or more masks to be used for fabricating the various layers of IC device 1060 according to IC design layout 1022. Mask house 1030 performs mask data preparation 1032, where IC design layout 1022 is translated into a representative data file ("RDF"). Mask data preparation 1032 provides the RDF to mask fabrication 1044. Mask fabrication 1044 includes a mask writer. A mask writer converts the RDF to an image on a substrate, such as a mask (reticle) or a semiconductor wafer. The design layout is manipulated by mask data preparation 1032 to comply with particular characteristics of the mask writer and/or requirements of IC fab 1050. In FIG. 10, mask data preparation 1032 and mask fabrication 1044 are illustrated as separate elements. In some embodiments, mask data preparation 1032 and mask fabrication 1044 can be collectively referred to as mask data preparation.

In some embodiments, mask data preparation 1032 includes optical proximity correction (OPC) which uses lithography enhancement techniques to compensate for image errors, such as those that can arise from diffraction, interference, other process effects and the like. OPC adjusts IC design layout 1022. In some embodiments, mask data preparation 1032 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 1032 includes a mask rule checker (MRC) that checks the IC design layout that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout to compensate for limitations during mask fabrication 1044, which may undo part of the modifications performed by OPC in order to meet mask creation rules.

In some embodiments, mask data preparation 1032 includes lithography process checking (LPC) that simulates processing that will be implemented by IC fab 1050 to fabricate IC device 1060. LPC simulates this processing based on IC design layout 1022 to create a simulated manufactured device, such as IC device 1060. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout 1022.

It should be understood that the above description of mask data preparation 1032 has been simplified for the purposes of clarity. In some embodiments, data preparation 1032 includes additional features such as a logic operation (LOP) to modify the IC design layout according to manufacturing rules. Additionally, the processes applied to IC design layout 1022 during data preparation 1032 may be executed in a variety of different orders.

After mask data preparation 1032 and during mask fabrication 1044, a mask or a group of masks are fabricated based on the modified IC design layout. In some embodiments, an electron-beam (e-beam) or a mechanism of multiple e-beams is used to form a pattern on a mask (photomask or reticle) based on the modified IC design layout. The mask can be formed in various technologies. In some embodiments, the mask is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask includes a transparent substrate (e.g., fused quartz) and an opaque material (e.g., chromium) coated in the opaque regions of the mask. In another example, the mask is formed using a phase shift technology. In the phase shift mask (PSM), various features in the pattern formed on the mask are configured to have proper phase difference to enhance the resolution and imaging quality. In various examples, the phase shift mask can be attenuated PSM or alternating PSM. The mask(s) generated by mask fabrication 1044 is used in a variety of processes. For example, such a mask(s) is used in an ion implantation process to form various doped regions in the semiconductor wafer, in an etching process to form various etching regions in the semiconductor wafer, and/or in other suitable processes.

IC fab 1050 is an IC fabrication business that includes one or more manufacturing facilities for the fabrication of a variety of different IC products. In some embodiments, IC Fab 1050 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 1050 uses the mask (or masks) fabricated by mask house 1030 to fabricate IC device 1060. Thus, IC fab 1050 at least indirectly uses IC design layout 1022 to fabricate IC device 1060. In some embodiments, a semiconductor wafer 1052 is fabricated by IC fab 1050 using the mask (or masks) to form IC device 1060. Semiconductor wafer 1052 includes a silicon substrate or other proper substrate having material layers formed thereon. Semiconductor wafer further includes one or more of various doped regions, dielectric features, multilevel interconnects, and the like (formed at subsequent manufacturing steps).

Details regarding an integrated circuit (IC) manufacturing system (e.g., system 1000 of FIG. 10), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

In an embodiment, a semiconductor device comprises: fins extending substantially parallel to a first direction, at least one of the fins being a dummy fin; and at least one of the fins being an active fin; and at least one gate structure formed over corresponding ones of the fins and extending substantially parallel to a second direction, the second direction being substantially perpendicular to the first direction; wherein the fins and the at least one gate structure are located in a cell region which includes an odd number of fins. In an embodiment, the cell region is substantially rectangular and has first and second edges which are substantially parallel to the first direction; and neither of the first and second edges overlaps any of the fins. In an embodiment, 3. The semiconductor device of claim 1, wherein: the cell region includes 5 fins; and the cell region has a size, in the second direction, of 5 fins. In an embodiment, at least 2 of the 5 fins are active fins. In an embodiment, 4 of the 5 fins are active fins. In an embodiment, the cell region, relative to stacking in the second direction, is pan-stackable. In an embodiment, the cell region, relative to stacking in the second direction, is hetero-stackable.

In an embodiment, a semiconductor device comprises: cell regions, each of the cell regions including fins extending substantially parallel to a first direction, at least one of the fins being a dummy fin, and at least one of the fins being an active fin; and gate structures formed over corresponding ones of the fins and extending substantially parallel to a second direction, the second direction being substantially perpendicular to the first direction; wherein, relative to stacking in the second direction, at least a first one of the cell regions has a hetero-stackable configuration. In an embodiment, the semiconductor device is organized into: a first grid of rows, each row being substantially parallel to the first direction, and each row having substantially a first size in the second direction; and a second grid of columns, each column being substantially parallel to the second direction, and each column having substantially a second size in the first direction; the cell regions are located in corresponding rows such that each cell region has substantially the first size in the second direction, and in corresponding columns such that each cell region has a third size which is substantially a positive integer multiple of the second size; a second one of the cell regions has a hetero-stackable configuration; the first and second cell regions are located substantially in the same column; and the first and second cell regions are located substantially in corresponding first and second rows which are separated by at least a third row. In an embodiment, the cell region is substantially rectangular and has first and second edges which are substantially parallel to the first direction; and neither of the first and second edges overlaps any of the fins. In an embodiment, the cell region includes 5 fins; an integer number X of the fins which are active is 2≤X≤4; and the cell region has a size, in the second direction, of 5 fins. In an embodiment, at least a second one and a third one of the cell regions are pan-stackable; the first cell region is stacked on the second cell region; and the third cell region is stacked on the first cell region. region. In an embodiment, at least a fourth one of the cell regions is pan-stackable; and at least one of the following is true: the second cell region is stacked on the fourth cell region; or the fourth cell region is stacked on the third cell region.

In an embodiment, a method of generating a layout diagram (the layout diagram being stored on a non-transitory computer-readable medium) comprises: generating fin patterns; arranging the fin patterns substantially parallel to a first direction; designating as a dummy fin pattern at least one of the fins patterns; designating as an active fin pattern at least one of the fin patterns; generating at least one gate pattern; arranging the at least one gate pattern to be substantially parallel to a second direction, the second direction being substantially perpendicular to the first direction; locating the at least one gate pattern over corresponding ones of the fin patterns; and defining a cell as including an odd number of fin patterns; wherein at least one aspect of the method is executed by a processor of a computer. In an embodiment, the defining includes: setting a place-and-route (PR) boundary of the cell to be substantially rectangular; arranging first and second edges of the PR boundary to be substantially parallel to the first direction; and locating the first and second edges so that neither of the first and second edges overlaps any of the fin patterns. In an embodiment, the defining includes: configuring the cell to include 5 fin patterns. In an embodiment, the defining further includes: designating at least 2 of the 5 fin patterns as active fin patterns. In an embodiment, the designating includes: designating 4 of the 5 fin patterns as active fin patterns. In an embodiment, the defining includes: configuring the cell, relative to stacking in the second direction, to be pan-stackable. In an embodiment, the defining includes: configuring the cell, relative to stacking in the second direction, to be hetero-stackable. In an embodiment, the method further comprises: fabricating, based on the layout diagram, at least one of (A) one or more semiconductor masks or (B) at least one component in a layer of an inchoate semiconductor integrated circuit.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A semiconductor device comprising:
   fins extending substantially parallel to a first direction, the fins including:
      one or more dummy fins, a total number of the one or more dummy fins being odd; and
      at least two of the fins being active fins that include a first active fin and a second active fin, a total number of the at least two active fins being even;
   at least one gate structure formed over corresponding ones of the fins and extending substantially parallel to a second direction, the second direction being substantially perpendicular to the first direction;
   wherein the fins and the at least one gate structure are located in a cell region which includes an odd number of fins; and
   wherein at least one of the one or more dummy fins is between the first active fin and the second active fin.

2. The semiconductor device of claim 1, wherein:
   the cell region is substantially rectangular and has first and second edges which are substantially parallel to the first direction; and
   neither of the first and second edges overlaps any of the fins.

3. The semiconductor device of claim 1, wherein:
   the cell region includes 5 fins; and
   the cell region has a size, in the second direction, of 5 fins.

4. The semiconductor device of claim 3, wherein:
   more than 2 of the 5 fins are active fins.

5. The semiconductor device of claim 4, wherein:
   4 of the 5 fins are active fins.

6. The semiconductor device of claim 1, wherein:
   the cell region, relative to stacking in the second direction, is pan-stackable.

7. The semiconductor device of claim 1, wherein:
   the cell region, relative to stacking in the second direction, is hetero-stackable.

8. A semiconductor device comprising:
   cell regions, each of the cell regions including:
      fins extending substantially parallel to a first direction, the fins including:
         one or more dummy fins, a total number of the one or more dummy fins being odd; and
         at least two active fins that include a first active fin and a second active fin, a total number of the at least two active fins being even;
      gate structures formed over corresponding ones of the fins and extending substantially parallel to a second direction, the second direction being substantially perpendicular to the first direction; and
   wherein:
      at least one of the one or more dummy fins being between the first active fin and the second active fin; and
      relative to stacking in the second direction, at least a first one of the cell regions has a hetero-stackable configuration.

9. The semiconductor device of claim 8, wherein:
   the semiconductor device is organized into:
      a first grid of rows;
         each row being substantially parallel to the first direction; and
         each row having substantially a first size in the second direction; and
      a second grid of columns;
         each column being substantially parallel to the second direction; and
         each column having substantially a second size in the first direction;
   the cell regions are located:
      in corresponding rows such that each cell region has substantially the first size in the second direction; and
      in corresponding columns such that each cell region has a third size which is substantially a positive integer multiple of the second size;
   a second one of the cell regions has a hetero-stackable configuration;
   the first and second cell regions are located substantially in the same column; and
   the first and second cell regions are located substantially in corresponding first and second rows which are separated by at least a third row.

10. The semiconductor device of claim 8, wherein:
    each cell region is substantially rectangular and has first and second edges which are substantially parallel to the first direction; and
    neither of the first and second edges overlaps any of the fins.

11. The semiconductor device of claim 8, wherein:
each cell region includes 5 fins;
an integer number X of the fins which are active is 2≤X≤4; and
each cell region has a size, in the second direction, of 5 fins.

12. The semiconductor device of claim 8, wherein:
at least a second one and a third one of the cell regions are pan-stackable;
the first cell region is stacked on the second cell region; and
the third cell region is stacked on the first cell region.

13. The semiconductor device of claim 12, wherein:
at least a fourth one of the cell regions is pan-stackable; and
at least one of the following is true:
  the second cell region is stacked on the fourth cell region; or
  the fourth cell region is stacked on the third cell region.

14. The semiconductor device of claim 8, wherein:
the cell structure includes an odd number of fins.

15. The semiconductor device of claim 11, wherein:
more than 2 of the 5 fins are active fins.

16. The semiconductor device of claim 15, wherein:
4 of the 5 fins are active fins.

17. A semiconductor device comprising:
fins extending substantially parallel to a first direction, the fins including:
  one or more dummy fins, a total number of the one or more dummy fins being odd; and
  at least two active fins that include a first active fin and a second active fin, a total number of the at least two active fins being even;
at least one gate structure formed over corresponding ones of the fins and extending substantially parallel to a second direction, the second direction being substantially perpendicular to the first direction; and
wherein:
  at least one of the one or more dummy fins are between the first active fin and the second active fin;
  the fins and the at least one gate structure are located in a cell region which includes 5 fins; and
  the cell region has a size, in the second direction, of 5 fins.

18. The semiconductor device of claim 17, wherein:
more than 2 of the 5 fins are active fins.

19. The semiconductor device of claim 18, wherein:
4 of the 5 fins are active fins.

20. The semiconductor device of claim 17, wherein:
the cell region, relative to stacking in the second direction, is pan-stackable.

\* \* \* \* \*